(12) United States Patent
Sasada et al.

(10) Patent No.: US 8,733,918 B2
(45) Date of Patent: May 27, 2014

(54) IMAGE FORMING METHOD

(75) Inventors: Misato Sasada, Kanagawa (JP); Minoru Sakai, Kanagawa (JP); Kiyoshi Irita, Kanagawa (JP); Jun Matsumoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 323 days.

(21) Appl. No.: 13/072,796

(22) Filed: Mar. 28, 2011

(65) Prior Publication Data

US 2011/0242192 A1  Oct. 6, 2011

(30) Foreign Application Priority Data

Mar. 30, 2010  (JP) ................................. 2010-079521

(51) Int. Cl.
 *B41J 2/00* (2006.01)
(52) U.S. Cl.
 USPC ........................................................ 347/100
(58) Field of Classification Search
 USPC .................................................... 347/100, 20
 See application file for complete search history.

(56) References Cited

U.S. PATENT DOCUMENTS

| | | | | |
|---|---|---|---|---|
| 8,227,054 | B2 * | 7/2012 | Ono et al. ................... | 428/32.21 |
| 2002/0064603 | A1 | 5/2002 | Noguchi | |
| 2002/0065335 | A1 | 5/2002 | Noguchi | |
| 2003/0203133 | A1 * | 10/2003 | Maekawa ..................... | 428/32.1 |
| 2009/0053409 | A1 * | 2/2009 | Yamamoto et al. ........... | 427/195 |
| 2009/0075206 | A1 * | 3/2009 | Kanchiku et al. .......... | 430/286.1 |
| 2009/0130312 | A1 * | 5/2009 | Ono et al. ..................... | 427/288 |

FOREIGN PATENT DOCUMENTS

| | | |
|---|---|---|
| JP | 2000-186242 | 7/2000 |
| JP | 2001-115067 | 4/2001 |
| JP | 2001-323194 A | 11/2001 |
| JP | 2008-024770 | 2/2008 |
| JP | 2009-125948 A | 6/2009 |

OTHER PUBLICATIONS

Partial English language translation of the following: Office action dated Jul. 16, 2003 from the Japanese Patent Office in a Japanese patent application corresponding to the instant patent application. This office action translation is submitted now in order to supplement the understanding of patent document JP 2008-024770, JP2001-115067 and JP2000-186242 which are cited in the office action and are being disclosed in the instant Information Disclosure Statement.

\* cited by examiner

*Primary Examiner* — Laura Martin
(74) *Attorney, Agent, or Firm* — SOLARIS Intellectual Property Group, PLLC

(57) ABSTRACT

The present invention provides an image forming method including ejecting an ink composition, using an ink jet apparatus, onto a recording medium thereby forming an image, the ink composition comprising a pigment, a water-soluble polymerizable monomer which is polymerized by actinic energy rays, and water, and the recording medium being composed of a base paper, a first layer including a binder, and a second layer including a white pigment and an acidic substance, which are disposed in this order, wherein a surface of the first layer is disposed on the base paper and has a Cobb water absorption capacity of 2.0 g/m$^2$ or less at a contact time of 120 seconds as measured by a water-absorbing capacity test according to JIS P8140, a surface of the second layer has a water absorption of from 2 ml/m$^2$ to 8 ml/m$^2$ at a contact time of 0.5 seconds as measured by the Bristow's method, and the surface of the second layer has a pH of 5.5 or less.

20 Claims, 1 Drawing Sheet

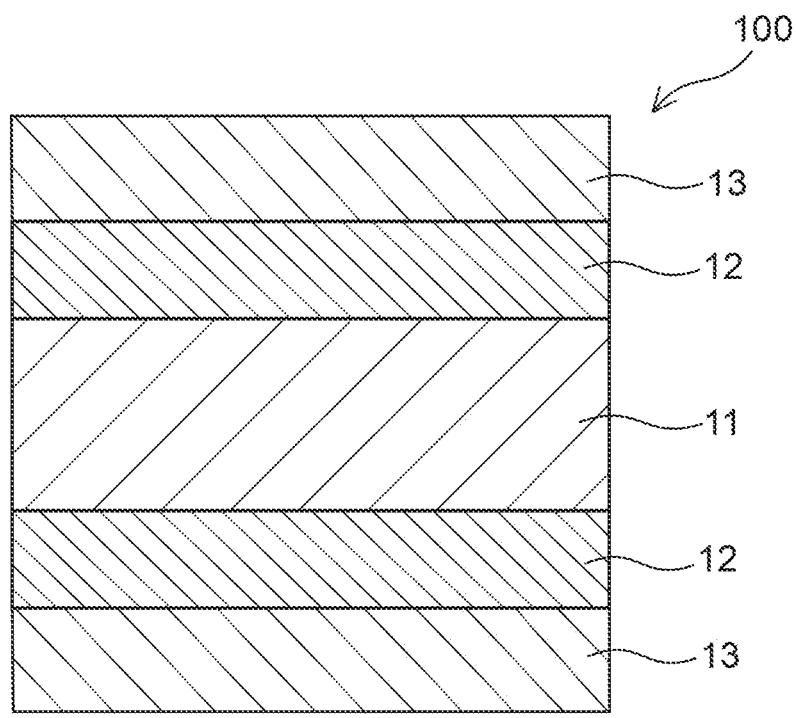

IMAGE FORMING METHOD

CROSS-REFERENCE TO RELATED APPLICATION

This application claims priority under 35 USC 119 from Japanese Patent Application No. 2010-079521, filed on Mar. 30, 2010, the disclosure of which is incorporated by reference herein.

BACKGROUND OF THE INVENTION

1. Field of the Invention

The present invention relates to an image forming method.

2. Description of the Related Art

Ink jet is a process of color image recording. The ink jet technique has been used in the field of office printers and home-use printers. In recent years, the ink jet technique has been applied in the field of industrial printing.

In particular, the need for high-speed printing is growing in recent years. When ink jet recording is carried out using a high-speed printing system such as a single pass system, high quality images are formed at a low cost through the use of, for example, a recording medium disclosed in Japanese Patent Application Laid-Open (JP-A) No. 2009-125948. The recording medium will not cause bronzing or mixing of colors while preventing curling, cockling, and paper deformation.

On the other hand, in order to give good abrasion resistance to inks containing pigments, for example, JP-A No. 2001-323194 discloses a method for applying an ink jet ink containing a coloring material and a photocurable monomer to a recording medium having a porous ink image-receiving layer.

In the ink described in JP-A No. 2009-125948 which contains a pigment and polymer particles, the polymer particles work as a binder to improve fixability and water resistance to some extent. However, since the fixability depends on the thermal properties of the polymer, it may be insufficiently improved, particularly conspicuously in high-speed recording. In such cases, the softening point of the polymer is decreased thereby accelerating the fixation to some extent, but also causes the deterioration of the adhesiveness of the image in a high temperature environment, and thus hinders the achievement of these performances.

The method described in JP-A No. 2001-323194 causes coalescence of ink droplets (spotting interference) during high-speed printing, and is not suitable for high-speed recording.

The invention has been accomplished in view of the above problems, and is intended to provide an image forming method which allows the formation of high definition images having good adhesiveness to the recording medium and good drawing properties, even in high-speed recording.

SUMMARY OF THE INVENTION

The present invention has been made in view of the above circumstances and provides an image forming method.

A first aspect of the present invention provides an image forming method including ejecting an ink composition, using an ink jet apparatus, onto a recording medium thereby forming an image, the ink composition comprising a pigment, a water-soluble polymerizable monomer which is polymerized by actinic energy rays, and water, and the recording medium being composed of a base paper, a first layer including a binder, and a second layer including a white pigment and an acidic substance, which are disposed in this order, wherein a surface of the first layer is disposed on the base paper and has a Cobb water absorption capacity of 2.0 g/m² or less at a contact time of 120 seconds as measured by a water-absorbing capacity test according to JIS P8140, a surface of the second layer has a water absorption of from 2 ml/m² to 8 ml/m² at a contact time of 0.5 seconds as measured by the Bristow's method, and the surface of the second layer has a pH of 5.5 or less.

The disclosure of JIS P8140 is incorporated by reference herein.

BRIEF DESCRIPTION OF THE DRAWINGS

FIG. 1 is a schematic block diagram illustrating an example of the structure of the recording medium according to the present invention.

DETAILED DESCRIPTION OF THE INVENTION

The invention provides an image forming method which allows the formation of high definition images having good adhesiveness to the recording medium and good drawing properties, even in high-speed recording.

<Image Forming Method>

The image forming method of the present invention includes ejecting an ink composition by an ink jet method onto a recording medium thereby forming an image, the ink composition containing at least a pigment, a water-soluble polymerizable monomer (hereinafter may be referred to simply as "polymerizable monomer") which is polymerized by actinic energy rays, and water, and the recording medium (hereinafter may be referred to as "specific recording medium") being composed of a base paper, a first layer containing a binder, and a second layer containing a white pigment and an acidic substance, which are disposed in this order, the surface of the first layer located on the base paper having a Cobb water absorption degree of 2.0 g/m² or less at a contact time of 120 seconds as measured by the water-absorbing capacity test according to JIS P8140, the surface of the second layer having a water absorption of from 2 ml/m² to 8 ml/m² at a contact time of 0.5 seconds as measured by the Bristow's method, and the surface of the second layer having a pH of 5.5 or less. If necessary, the image forming method may further include other steps.

The application of the ink composition containing the polymerizable monomer to the specific recording medium allows the formation of high definition images with good adhesiveness to the recording medium and little spotting interference, even in high-speed recording.

[Ink Application Step]

In the ink application step according to the invention, ink composition containing a pigment, a water-soluble polymerizable monomer, and water is applied to a specific recording medium by the ink jet method, thereby forming an image. Details about the recording medium and ink composition will be described later.

(Ink Jet Method)

In image formation using the ink jet method, an ink composition is ejected onto a recording medium upon energy application, thereby forming a color image. The method described in the paragraphs 0093 to 0105 of JP-A No. 2003-306623 is a preferred ink jet recording method suitable for the invention.

The ink jet method is not particularly limited, and may use a known system, such as a charge controlling system of ejecting ink using electrostatic induction force, a drop on demand system (pressure pulse system) of using the vibratory pressure of piezo elements, an acoustic ink jet system of ejecting ink droplets using the radiation pressure applied onto the ink by acoustic beam converted from an electric signal.

Further, the ink jet head used in the ink jet method may use an on-demand system or a continuous system. The ink nozzle used for recording by the ink jet method is also not particularly limited, and may be selected as appropriate according to the intended use.

Other examples of the ink jet method include a system of ejecting many small-volume droplets of an ink with a low concentration, which is referred to as a photo ink, a system of improving the image quality using plural inks which substantially have the same hue and different concentrations, and a system of using a colorless and transparent ink.

The ink jet method also includes a shuttle system wherein a short serial head is moved in the width direction of the recording medium to record an image, and a line system using a line head composed of recording devices arranged along the length of one side of the recording medium. In the line system, the recording medium is scanned in the direction orthogonal to the arrangement direction of the recording devices to record an image on the entire surface of the recording medium. The line system requires no conveyor system such as a carriage for conveying the short head. In addition, the line system does not require the movement of the carriage and complicated control of recording medium scanning. Therefore, the recording medium is moved alone, and thus a higher recording speed is achieved in comparison with the shuttle system.

The amount of an ink droplet ejected from an ink jet head is preferably from 1 to 10 pl (picoliter), and more preferably from 1.5 to 6 pl, thereby obtaining a high definition image. It is effective for the improvement of the image irregularities and the continuity of continuous tones to combine different amounts of ink droplets. The invention is also suitable for this case.

The amount of the ink composition applied to the recording medium may be appropriately selected according to, for example, the desired image density. From the viewpoints of image adhesiveness and image density, the maximum application amount of the ink composition is more preferably from 3 to 20 ml/m$^2$, and even more preferably from 5 to 15 ml/m$^2$.

[Actinic Energy Rays Step]

The image forming method of the invention preferably includes a step of irradiating the ink composition deposited on the recording medium with an active energy ray. Upon actinic energy rays, the polymerizable monomer contained in the ink composition is polymerized to form a hardened film containing a pigment. As a result of which, the adhesiveness, abrasion resistance, and blocking resistance of the image are more effectively improved.

The ink composition applied to the recording medium is curened by actinic energy rays. This is due to that, for example, a polymerization initiator, which is contained as appropriate, in the ink composition is decomposed by actinic energy rays, to generate initiating species such as a radical, acid, or base, and the initiating species initiates and accelerates the polymerization reaction of the polymerizable monomer.

Examples of the active energy ray include α rays, γ rays, electron beams, X rays, ultraviolet light, visible light, and infrared light. The wavelength of the active energy ray is preferably, for example, from 200 to 600 nm, more preferably from 300 to 450 nm, and even more preferably from 350 to 420 nm.

The power of the actinic energy rays is preferably 5000 mJ/cm$^2$ or less, more preferably from 10 to 4000 mJ/cm$^2$, and even more preferably from 20 to 3000 mJ/cm$^2$, in terms of the total dose. When the total dose of the actinic energy rays is within this range, the adhesiveness of the image is more effectively improved.

Mercury lamps, gas lasers, and solid-state lasers are predominantly used as the sources of active energy rays. Mercury lamps and metal halide lamps are widely known as light sources for curing UV-curable inks for ink jet recording. However, at present, elimination of mercury is greatly desired from the viewpoint of environmental protection, and the replacement with GaN semiconductor UV emitting devices is very effective from both the industrial and environmental viewpoints. Further, LEDs (UV-LEDs) and LDs (UV-LDs) are expected to be the light sources for photocurable ink jet inks owing to their compact size, long life, high effectiveness, and low cost.

The source of an active energy ray may be a light emitting diode (LED) or a laser diode (LD). In particular, when a UV light source is necessary, either a UV LED or a UV LD may be used. For example, a purple LED having a main emission spectrum in the wavelength range from 365 nm to 420 nm is commercially available from Nichia Corporation.

In the invention, the source of an active energy ray is particularly preferably a UV-LED, and particularly preferably a UV-LED having a peak wavelength in the range from 350 to 420 nm.

[Ink Drying Step]

The image forming method of the invention may include, if necessary, an ink drying step for drying and removing the ink solvent (for example, water or a water-soluble organic solvent) from the ink composition applied to the recording medium. The ink drying step is not particularly limited as long as it removes at least a portion of the ink solvent, and may use a common method.

For example, the ink drying may be carried out by a known heating means such as a heater, a blowing means such as a dryer, or a combination of these means. Examples of the heating method include a method of applying heat to the recording medium from a side opposite to the side coated with the treatment liquid, a method of applying warm or hot air to the recording medium on the side coated with the treatment liquid, and a heating method using an infrared heater. These heating methods may be used in combination.

The ink drying step is carried out after the ink application step, and may be carried out before or after the actinic energy rays step. In the invention, from the viewpoints of curing sensitivity and adhesiveness, the ink drying step is preferably carried out before the actinic energy rays step.

The recording medium, ink composition, and treatment liquid used in the image forming method of the invention are further described below in detail.

[Recording Medium]

The recording medium in the invention includes a base paper, and first and second layers provided in this order from the base paper side, and, if necessary, may further include other layer selected as appropriate. The recording medium of the invention is composed of, for example, as illustrated by a recording medium 100 shown in FIG. 1, a fine paper 11 as the base paper, a solvent blocking layer 12 as the first layer formed on the fine paper 11, and a coat layer 13 as the second layer formed on the solvent blocking layer 12. The recording medium may be in the form of a sheet or roll.

(Base Paper)

The base paper is not particularly restricted and may be appropriately selected from known ones depending on the object.

As pulp that is used as a raw material of a base paper, from the viewpoints of simultaneously improving the surface smoothness, stiffness and dimensional stability (curling property) of the base paper with balance to a high level, leaf bleached kraft pulp (LBKP) is desirable. Furthermore, needle bleached kraft pulp (NBKP) and leaf bleached sulfite pulp (LBSP) may be used as well.

When the pulp is digested, a beater or a refiner may be used. In a pulp slurry (hereinafter, in some cases, referred to as "pulp paper stock") obtained after the pulp is digested, as needs arise, various kinds of additives such as a filler, a dry paper strengthening agent, a sizing agent, a wet paper strengthening agent, a fixing agent, a pH regulating agent and other chemicals are added.

Examples of fillers include calcium carbonate, clay, kaolin, white earth, talc, titanium oxide, diatom earth, barium sulfate, aluminum hydroxide and magnesium hydroxide.

Examples of the dry paper strengthening agents include cationized starch, cationized polyacrylamide, anionized polyacrylamide, amphoteric polyacrylamide and carboxy-modified polyvinyl alcohol.

Examples of the sizing agents include fatty acid salt, rosin, rosin-derivatives such as maleinized rosin, paraffin wax, alkyl ketene dimer, alkenyl succinate anhydride (ASA) and epoxidized fatty acid amide.

Examples of the wet paper strengthening agents include a polyaminepolyamide epichlorohydrine, a melamine resin, a urea resin and an epoxidized polyamide resin.

Examples of the fixing agents include multi-valent metal salts such as aluminum sulfate or aluminum chloride and cationized polymers such as cationized starch.

Examples of the pH regulator include sodium hydroxide and sodium carbonate.

Examples of the other chemicals include a defoaming agent, a dye, a slime control agent and a fluorescent brightener.

Furthermore, to the pulp paper stock, as needs arise, a softener may be added as well. The softener is described in, for instance, "Sin Kamikakou Binran (New Paper Processing Handbook)" (edited by Siyaku Times Co.,), 554 to 555 (1980).

In a treatment solution used in surface sizing, for instance, an aqueous polymer, a sizing agent, a water resistant material, a pigment, a pH regulator, a dye and a fluorescent brightener may be contained.

Examples of the aqueous polymers include cationized starch, polyvinyl alcohol, carboxy-modulated polyvinyl alcohol, carboxymethylcellulose, hydroxyethylcellulose, cellulose sulfate, gelatin, casein, sodium polyacrylate, sodium salt of styrene-maleic anhydride copolymer and sodium polystyrene sulfonate.

Examples of the sizing agents include petroleum resin emulsion, ammonium salt of styrene-maleic anhydride copolymer alkyl ester, rosin, higher fatty acid salt, alkyl ketene dimer (AKD) and epoxidized fatty acid amide.

Examples of the water resistant materials include latex emulsions of styrene-butadiene copolymer, ethylene-vinyl acetate copolymer, polyethylene or vinylidene chloride copolymer and polyamidepolyamine epichlorhydrine.

Examples of the pigments include calcium carbonate, clay, kaolin, talc, barium sulfate and titanium oxide.

Examples of the pH regulator include hydrochloric acid, sodium hydroxide and sodium carbonate.

Examples of materials of base papers may include, other than the above-mentioned natural pulps, synthetic pulp paper, mixed paper of natural pulp and synthetic pulp and various kinds of combination papers.

A thickness of the base paper is preferably from 30 to 500 μm, more preferably from 50 to 300 μm and still more preferably from 70 to 200 μm.

(First Layer)

In the recording medium, the first layer is located on the base paper. The first layer prevents the permeation of the ink solvent into the base paper. Examples of known paper composed of a base paper and a solvent blocking layer include those having a film layer, which is composed mainly of a polyethylene resin, formed on the base paper surface. Such paper having the solvent blocking layer for producing water resistance will achieve almost complete preventive effect against water permeation, but the feel of the paper is not satisfactory.

The first layer includes at least a binder, and the surface of the first layer located on the base paper has a Cobb water absorption degree of 2.0 g/m$^2$ or less at a contact time of 120 seconds as measured by the water-absorbing capacity test according to JIS P8140. The first layer is not particularly limited as long as the Cobb water absorption degree is within this range, and may be selected as appropriate from known ones according to the intended use. If the Cobb water absorption degree is more than 2.0 g/m$^2$, permeation of the ink solvent into the base paper cannot be sufficiently prevented, and deformation of the recording medium such as curling or cockling may occur.

The first layer may further include, in addition to the binder, other components such as a white pigment if necessary.

—Binder—

The first layer includes at least one kind of binders. The binder is used not only to disperse but also to improve the strength of a coated film.

Examples of the binders include polyvinyl alcohols (including modified polyvinyl alcohols such as acetoacetyl-modified, carboxyl-modified, itaconic-modified, maleic-modified, silica-modified or amino group-modified one), methylcellulose, carboxy methylcellulose, starches (including modified starches), gelatin, rubber Arabic, casein, a styrene-maleic anhydride copolymer hydrolysate, polyacrylamide and saponified vinyl acetate-acrylic acid copolymer. Furthermore, latex type thermoplastic resins of synthetic polymers such as styrene-butadiene copolymer, vinyl acetate copolymer, acrylonitrile-butadiene copolymer, methyl acrylate-butadiene copolymer or polyvinylidene chloride.

Examples of the polyvinyl alcohols include polyvinyl alcohols obtained by saponifying a lower alcohol solution of polyvinyl acetate and derivatives thereof and ones obtained by saponifying a copolymer between a monomer copolymerizing with vinyl acetate and vinyl acetate. Herein, examples of the monomers capable of copolymerizing with vinyl acetate include unsaturated carboxylic acid such as (anhydrous) maleic acid, fumaric acid, crotonic acid, itaconic acid, (meth)acrylic acid or an esters thereof; α-olefin such as ethylene or propylene; olefin sulfonic acid such as (meth)allyl sulfonic acid, ethylene sulfonic acid or sulfonic acid alkylmaleate; an alkali salt of olefin sulfonic acid such as sodium (meth)allylsulfonate, sodium ethylene sulfonate, sodium sulfonate alkyl (meth)acrylate, sodium sulfonate (monoalkyl malate) or sodium disulfonate alkyl malate; an amide group-containing monomer such as N-methylolacrylamide or an alkali salt of acrylamide alkylsulfonate; and a N-vinyl pyrolidone derivative.

Among polyvinyl alcohols, acetoacetyl modified polyvinyl alcohol can generally be produced by adding liquid or gaseous diketene to a solution, dispersion liquid, or powder of the polyvinyl alcohol for reaction. The degree of acetylation of acetoacetyl modified polyvinyl alcohol can be suitably determined according to the target quality, and is preferably from 0.1% by mol to 20% by mol, and more preferably from 0.5% by mol to 10% by mol.

Examples of the binders further include, in addition to general-purpose thermoplastic polymers such as polyolefins such as homopolymers of α-olefin such as polyethylene, polypropylene or polyvinyl chloride or mixtures thereof; polyamides and polyimides; and polyesters such as polyethylene terephthalate, known thermoplastic resins and latexes thereof such as homopolymers made of α-methylene fatty acid monocarboxylic acid esters such as methyl (meth)acrylate, ethyl (meth)acrylate, butyl (meth)acrylate, dodecyl (meth)acrylate, octyl (meth)acrylate or phenyl (meth)acrylate; styrenes such as styrene, chlorostyrene or vinyl styrene; vinyl esters such as vinyl acetate, vinyl propionate, vinyl succinate or vinyl butyrate; vinyl ethers such as vinyl methyl ether, vinyl ethyl ether or vinyl butyl ether; or vinyl ketones such as vinyl methyl ketone, vinyl hexyl ketone or vinyl isopropyl ketone, or as arbitrary copolymers containing the constitutional units.

Among them, from the viewpoint of water barrier properties, thermoplastic resins are preferred, and water-insoluble thermoplastic resins are more preferred. Examples of the water-insoluble thermoplastic resins include acrylic resins, acrylic silicon resins, acrylic epoxy resins, acrylic styrene resins, acrylic urethane resins, styrene-butadiene resins, acrylonitrile-butadiene resins, polyester resins, and vinyl acetate resins.

In particular, polyester urethane resins, acrylic silicon resins are preferred, because they are highly effective for preventing the permeation of ink solvents and cockling, and have cost efficiency and good manufacturability.

A molecular weight of the thermoplastic resin by number average molecular weight, is preferably from 3,000 to 1,000,000 and particularly preferably substantially from 5,000 to 100,000. The molecular weight, when it is 3,000 or more, allows securing the mechanical strength of the first layer and, when it is 1,000,000 or less, is advantageous from the production aptitudes such as dispersion stability and viscosity.

Specifically, as the acrylic resin, commercially available latexes such as water dispersive latexes described below are used. That is, preferable examples of the acrylic resins include "CEBIAN A4635, 46583 and 4601" (trade name, manufactured by Daicel Chemical Industries, Ltd.) and "NIPOL Lx811, 814, 820, 821 and 857" (trade name, manufactured by ZEON CORPORATION.). In particular, acryl emulsions of acryl silicone latexes described in JP-A Nos. 10-264511, 2000-43409, 2000-343811 and 2002-120452 (commercially available products include AQUABRID-series UM7760, UM7761 and UM4901, AQUABRID 903, AQUABRID ASi-86, AQUABRID ASi-89, AQUABRID ASi-91, AQUABRID ASi-753, AQUABRID ASi-4635, AQUABRID ASi-4901, AQUABRID MSi-04S, AQUABRID AU-124, AQUABRID AU-131, AQUABRID AEA-61, AQUABRID AEC-69 and AQUABRID AEC-162) are preferably used.

Moreover, examples of polyester urethane resin include commercially-available items, such as HYDRAN AP series, manufactured by DIC Corporation (e.g., HYDRAN AP-20, HYDRAN AP-30, HYDRAN AP-30F, HYDRAN AP-40(F), HYDRAN AP-50LM, HYDRAN APX-101H, HYDRAN APX-110, and HYDRAN APX-501).

It should be noted that it is preferable to select at least one member from the above-mentioned thermoplastic resins for use. The above-mentioned thermoplastic resins may be used singly or in combination of two or more.

The glass transition temperature (Tg) of the thermoplastic resin contained in the first layer is preferably 5° C. to 70° C. and particularly preferably 15° C. to 50° C. When the Tg is in the range in particular, a film-forming solution (such as coating solution) for forming a first layer is inhibited from causing a problem such as skinning to be easy to handle in production. Furthermore, without causing problems such that the Tg is too high to be able to obtain desired glossiness unless a calender temperature is set rather high and adhesion to a surface of a metal roll tends to occur to adversely affect on a surface state, high glossiness and high planarity are readily obtained.

Furthermore, the minimum film-forming temperature of the thermoplastic resin (preferably latex resin fine particles) is preferably from 20 to 60° C. and more preferably from 25 to 50° C. When the minimum film-forming temperature region capable of forming a film when a film is formed is within the range, the film-forming solution for forming the first layer (such as coating solution) is inhibited from a problem such as the skinning to be easy to handle in the production, and, when the second layer is formed, the permeation is suppressed to be excellent in a state of the coated surface of the formed second layer; accordingly, a layer having the microporosity sufficient for speedily transmitting an ink solvent is formed. Only by coating the solution (such as coating solution), excellent glossiness is not necessarily provided. However, when soft calender treatment is applied thereafter, a highly glossy layer having the microporosity is obtained.

A content of the binder (preferably thermoplastic resin) in the first layer is, relative to a total solid content of the first layer, preferably from 15 to 95% by mass and more preferably from 30 to 90% by mass. In the case where the content is within the range in particular, when the calender process is applied, the glossiness and planarity are excellent, the permeability of the ink solvent is obtained and the blurring with time is more effectively inhibited from occurring.

Furthermore, in the first layer, as needs arise, depending on the kind of the binder, an appropriate crosslinking agent of the binder may be added.

—Cobb's Water Absorbency—

In the invention, the Cobb's water absorbency measured according to the water absorbency test based on JIS P8140 from a first layer side of a base paper on which the first layer is disposed for 120 sec is set at 2.0 $g/m^2$ or less. When the Cobb's water absorbency is 2.0 $g/m^2$ or less, the base paper provided with the first layer has mild permeability to be able to delay absorption when a liquid such as ink is provided and reduce the degree of occurrence of curling.

Furthermore, the Cobb's water absorbency is preferred to be 1.0 $g/m^2$ or less. Still furthermore, the minimum value of the Cobb's water absorbency is desirably 0.2 $g/m^2$.

The Cobb water absorption degree is measured by the water-absorbing capacity test in accordance with JIS P8140; water is contacted with one side of the base paper, specifically the surface of the first layer of the base paper having the first layer (the side opposite to the base paper) for a certain time, and the amount of water absorbed into the surface is measured. In the invention, the contact time is 120 seconds.

In the first layer, other than the components, other components such as a white pigment, a film curing agent and a layered inorganic compound may be used.

—White Pigment—

Examples of the white pigments include titanium oxide, barium sulfate, barium carbonate, calcium carbonate, lithopone, alumina white, zinc oxide, silica antimony trioxide, titanium phosphate, aluminum hydroxide, kaolin, clay, talc, magnesium oxide and magnesium hydroxide.

Among them, from the viewpoints of whiteness, dispersibility, and stability, titanium oxide is particularly preferred. Further, from the viewpoint of water barrier properties, kaolin is particularly preferred. Examples of commercial kaolin include KAOBRIGHT 90, KAOGLOSS, and KAOWHITE (trade name, manufactured by Shiraishi Calcium Kaisha, Ltd.). The white pigment contained in the first layer prevents sticking to the calender roll when the first layer is subjected to calendering.

The particle size of the white pigment is preferably from 0.1 to 0.5 μm. When the particle size is within this range, good whiteness and glossiness are achieved.

Titanium oxide may be rutile or anatase, and may be used alone or in combination. The titanium oxide may be produced by the sulfuric acid method or chlorine method. The titanium oxide may be selected as appropriate from those having a surface coated with an inorganic substance such as hydrous alumina, hydrous silicon dioxide, or zinc oxide, an organic substance such as trimethylolmethane, trimethylolethane, trimethylolpropane, or 2,4-dihydroxy-2-methylpentane, or a siloxane such as polydimethylsiloxane.

The refraction index of the white pigment is preferably 1.5 or more. The white pigment having a refraction index within this range allows the formation of a high quality image.

Furthermore, the specific surface area of the white pigment due to the BET method is preferred to be less than 100 m²/g. When the white pigment having the specific surface area in the range is contained, when the second layer is coated and formed, the coating solution is inhibited from permeating; accordingly, the ink absorptivity of the second layer is heightened.

The BET method is one of surface area measurement methods of powder due to a gas phase adsorption method and a method where, from an adsorption isotherm, a total surface area that 1 g of sample has, that is, specific surface area is obtained. Usually, a method where, as an adsorption gas, nitrogen gas is used and an absorption amount is measured from a variation of pressure or volume of a gas to be adsorbed is general. As well-known one that expresses an isotherm of multimolecular adsorption, there is an equation of Brunauer, Emmett and Teller (BET equation). Based on the equation, an adsorption amount is obtained, followed by multiplying an area that one absorption molecule occupies on a surface to obtain a surface area.

The white pigments may be used singularly or in a combination of two or more kinds thereof.

A content of the white pigment in the first layer is, though different dependent on the kind of the white pigment, the kind of the thermoplastic resin and the layer thickness, relative to a mass (solid content) of the binder, usually desirably substantially in the range of 5 to 200% by mass.

—Hardener—

The first layer of the invention may include a hardener to harden the binder. Examples of the hardeners include aldehyde compounds, 2,3-dihydroxy-1,4-dioxane and derivatives thereof and compounds that have two or more of vinyl groups adjacent to a substitution group of which Hammett's substituent constant $\sigma_p$ is positive in a single molecule.

When the first layer contains the hardener, without thickening the film-forming solution of the first layer, the water resistance of the recording medium may be improved. Thereby, the coating stability of the film-forming solution of the first layer is improved and thereby the water resistance of the resulting recording medium as well is improved.

Examples of substitutional groups of which Hammett's substituent constant $\sigma_p$ is positive include a $CF_3$ group ($\sigma_p$ value: 0.54), a CN group ($\sigma_p$ value: 0.66), a $COCH_3$ group ($\sigma_p$ value: 0.50), a COOH group ($\sigma_p$ value: 0.45), a COOR (R expresses an alkyl group) group ($\sigma_p$ value: 0.45), a $NO_2$ group ($\sigma_p$ value: 0.78), a $OCOCH_3$ group ($\sigma_p$ value: 0.31), a SH group ($\sigma_p$ value: 0.15), a $SOCH_3$ group ($\sigma_p$ value: 0.49), a $SO_2CH_3$ group ($\sigma_p$ value: 0.72), a $SO_2NH_2$ group ($\sigma_p$ value: 0.57), a $SCOCH_3$ ($\sigma_p$ value: 0.44), a F group ($\sigma_p$ value: 0.06), a Cl group ($\sigma_p$ value: 0.23), a Br group ($\sigma_p$ value: 0.23), a I group ($\sigma_p$ value: 0.18), a $IO_2$ group ($\sigma_p$ value: 0.76), a $N^+(CH_3)_2$ group ($\sigma_p$ value: 0.82), and a $S^+(CH_3)_2$ group ($\sigma_p$ value: 0.90).

Examples of the compounds that have two or more of vinyl groups adjacent to a substitution group of which Hammett's substituent constant $\sigma_p$ is positive in a single molecule include, in addition to 2-ethylenesulfonyl-N-[2-(2-ethylenesulfonyl-acetylamino)-ethyl]acetamide, bis-2-vinylsulfonyl-ethyl ether, bisacryloylimide, N—N'-diacryloyl urea, 1,1-bis-vinylsulfone ethane and ethylene-bis-acrylamide, diacrylate and dimethacrylate compound expressed by formulae below, among these 2-ethylenesulfonyl-N-[2-(2-ethylenesulfonyl-acetylamino)-ethyl]acetamide being particularly preferred.

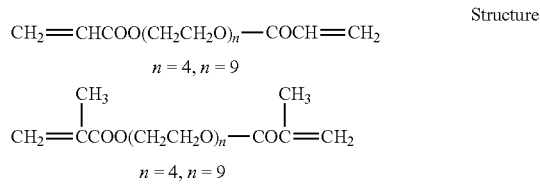

Structure

A content ratio of the hardener in the first layer is, relative to a solid content of the binder, preferably 0.1% by mass or more and 30% by mass or less and more preferably 0.5% by mass or more and 10% by mass or less. When the content of the hardener is within the range, the film-forming solution for the first layer is not thickened and the water resistance of the recording medium may be improved.

—Layered Inorganic Compound—

The first layer may further contain a layered inorganic compound. The layered inorganic compound is preferred to be a swelling inorganic layered compound and examples thereof include swelling clayey ores such as bentonite, hectorite, saponite, biederite, nontronite, stevensite, beidelite or montmorillonite, swelling synthetic mica and swelling synthetic smectite. The swelling inorganic layered compound has a stacked structure made of unit crystal lattice layers having a thickness from 1 to 1.5 nm and is very large in the metallic atom substitution within a lattice than other clayey ores; accordingly, a lattice layer causes positive charge deficiency and, in order to compensate the deficiency, positive ions such as $Na^+$, $Ca^{2+}$ or $Mg^{2+}$ are adsorbed between layers. The positive ion interposing between the layers is called an exchangeable positive ion and is exchanged by various positive ions. In particular when the interlayer positive ion is $Li^+$ or $Na^+$, owing to small ionic radius, bonding between layered crystal lattices is weak to be largely swollen by water. When shearing force is applied in this state, the layered inorganic compound is readily cleaved to form stable sol in water. Bentonite and water swellable synthetic mica are preferred because this tendency is strong. The water swellable synthetic mica is particularly preferred.

Examples of the water swellable synthetic micas include sodium tetrasilicic mica $NaMg_{2.5}(Si_4O_{10})F_2Na$, lithium teniolite $(NaLi)Mg_2(Si_4O_{10})F_2Na$ or lithium hectolite $(NaLi)/3Mg_2/3Li_{1/3}SiO_4O_{10}F_2$.

As to the size of the water swellable mica, it is preferable that a thickness is from 1 to 50 nm and a face size is from 1 to 20 μm. In order to control the diffusion, the thinner the thickness is, the better, and a plain size is better larger within a range that does not deteriorate the smoothness and transparency of a coated surface. Accordingly, the aspect ratio is preferably 100 or more, more preferably 200 or more and particularly preferably 500 or more.

When the water swellable synthetic mica is used, a mass ratio x/y of a mass (solid content) x of a binder in the first layer to a mass y of water swellable synthetic mica is preferably in the range of 1 or more and 30 or less and more preferably in the range of 5 or more and 15 or less. When the mass ratio is within the range, oxygen permeation and blister generation are effectively suppressed.

In the first layer, a known additive such as an anti-oxidant as well may be added.

A thickness of the first layer is preferably in the range of 1 to 30 μm and more preferably in the range of 5 to 20 μm. When the thickness of the first layer is within the range, the surface glossiness when the calender treatment is applied later is improved, the whiteness is obtained with a slight amount of the white pigment and the handling property such as folding aptitude is made same as that of a coat paper or an art paper.

In order to prevent the permeation of the ink solvent and achieve good surface properties, the first layer in the invention preferably includes, for example, a thermoplastic resin (preferably thermoplastic resin particles, more preferably polyester urethane resin particles, acrylic silicon resin particles) as the binder, and kaolin as the white pigment, wherein the mass ratio between the mass (solid content) x of thermoplastic resin and the mass y of kaolin (x/y) is preferably from 1 to 30.

(Second Layer)

The recording medium of the invention further includes a second layer on the first layer formed on the base paper.

The second layer includes at least a white pigment and an acidic substance, the surface of the second layer having a water absorption of from 2 ml/m$^2$ to 8 ml/m$^2$ at a contact time of 0.5 seconds as measured by the Bristow's method, and the surface of the second layer having a pH of 5.5 or less. The second layer is not particularly limited as long as these ranges are satisfied, and may be selected as appropriate from known ones according to the intended use.

The second layer may further include, if necessary, other component such as a water-soluble polyvalent metal compound or a thermoplastic resin.

The second layer in the invention is preferably, for example, a layer which further includes a water-soluble polyvalent metal compound, a layer which further includes a thermoplastic resin, a layer which further includes a thermoplastic resin at a ratio of 10 to 60 parts by solid mass with reference to 100 parts by solid mass of the white pigment, or a layer whose surface has a pH of 4 or less.

—White Pigment—

The second layer contains at least one white pigment. The white pigment keeps the ink (specifically the pigment contained in the ink) within the second layer, and improves the background whiteness.

The white pigment contained in the second layer is not particularly limited, and may be selected from common white pigments for coated printing paper, such as calcium carbonate, kaolin, titanium dioxide, aluminum trihydroxide, zinc oxide, barium sulfate, satin white, and talc.

Among them, from the viewpoint of glossiness, kaolin is particularly preferred. Examples of the kaolin include KAO-BRIGHT 90, KAOGLOSS, and KAOWHITE (trade name, manufactured by Shiraishi Calcium Kaisha, Ltd.), CONTOUR 1500, ASTRA-PLATE, XP03-8390 (trade name, manufactured by Imerys Minerals Japan K.K.), and MIRROR-GLOSS (trade name, manufactured by Engelhard Corporation).

Among the kaolin products, those having an aspect ratio of 30 or more are more preferred. When the aspect ratio is 30 or more, the kaolin readily keeps the ink (specifically the pigment contained in the ink) within the second layer, and thus further improves the ink fixability.

When the recording medium is used for image formation according to the ink jet image forming method of the invention, more specifically, when the pH of the second layer surface is adjusted to an acidic range (preferably pH 4 or less), and when ink drawing is carried out using the below treatment liquid containing an acidic substance, the content of calcium carbonate is preferably 5% by mass or less, more preferably 1% by mass or less with reference to the total pigments in the second layer, and it is even more preferred that the second layer contain no calcium carbonate, thereby preventing image bleeding and color mixing during ink drawing.

The content of the white pigment in the second layer is preferably from 70 to 96% by mass, and more preferably from 80 to 94% by mass, with reference to the total solid content of the second layer.

The particle size of the first white pigment in the second layer is the same as the particle size of the second white pigment in the first layer.

—Acidic Substance—

The second layer contains at least one acidic substance. The acidic substance contained in the second layer coagulates the components of the ink composition applied, and improves fixability of the formed image. More specifically, for example, when the ink containing a pigment as a coloring component is deposited on the second layer, the pigment coagulates upon pH change, whereby ink bleeding with the passage of time and mixing of colors (bleeding of colors) are effectively prevented.

The acidic substance may be selected from known acidic substances, and may be an inorganic or organic acid. Examples of the acidic substance include inorganic acids such as hydrochloric acid and nitric acid, and compounds having a phosphate group, a phosphonate group, a phosphine group, a sulfate group, a sulfonate group, a sulfinate group, a carboxylic group, or a group derived from any salt of these groups. Other preferred examples include acid polymers.

Examples of compounds that have a phosphoric acid group include phosphoric acid, polyphosphoric acid or derivatives of compounds thereof, or salts thereof. Examples of compounds that have a carboxylic acid group include compounds that have a furan, pyrrole, pyrroline, pyrolidone, pyrone, pyrrole, thiophene, indole, pyridine or quinoline structure and further have a carboxy group as a functional group such as pyrolidone carboxylic acid, pyrone carboxylic acid, pyrrole carboxylic acid, furan carboxylic acid, pyridine carboxylic acid, coumaric acid, thiophene carboxylic acid, nicotinic acid, or derivatives thereof, or salts thereof.

In particular, the acidic substance is preferably at least one selected from hydrochloric acid, sulfuric acid, nitric acid, methanesulfonic acid, phosphonic acid, phosphoric acid, polyphosphoric acid, metaphosphoric acid, oxalic acid, tartaric acid, malic acid, malonic acid, citric acid, fumaric acid, maleic acid, succinic acid, salicylic acid, phthalic acid, lactic acid, acetic acid, trichloroacetic acid, chloroacetic acid, 2-pyrrolidone-5-carboxylic acid, picolinic acid, quinolinic acid, polyacrylic acid, polysulfone acid, and polyphosphonic acid, and is more preferably at least one selected from malonic acid, succinic acid, tartaric acid, malic acid, maleic acid, and citric acid.

From the viewpoint of the coagulation rate of the pigment ink, methanesulfonic acid and phosphoric acid are preferred, and from the viewpoint of long-term storage and stability of the paper, oxalic acid, tartaric acid, malonic acid, and citric acid are preferred, and from the viewpoint of image fixability, succinic acid and phthalic acid are preferred.

It is also preferred that the acidic substance contained in the second layer be an acidic polymer. The acidic polymer is particularly preferably polyphosphoric acid, polyacrylic acid, polysulfone acid, or polyphosphonic acid, because these acidic substances hardly diffuse in the paper, whereby worsening of bleeding of colors with the passage of time is prevented, and thus the paper has long-term storage stability before printing.

In the invention, from the viewpoints of the adhesiveness of the image to be formed and the prevention of spotting interference, the acidic substance is preferably a compound having a molecular weight of 100 or more and two or more carboxy groups in one molecule thereof, and more preferably a compound having a molecular weight of 100 or more, and two or more carboxy groups in one molecule thereof, the $pKa_1$ (first acid dissociation constant, 25° C.) being from 2.6 to 4.6, and the $pKa_2$ (second acid dissociation constant, 25° C.) being from 3.8 to 5.4.

Further, from the viewpoint of the coagulation rate of the ink component, the water solubility of the acidic substance is preferably 5% by mass or more, and more preferably from 30% by mass to 70% by mass.

Among the above acidic substances, examples of the acidic substance having a molecular weight of 100 or more, and two or more carboxy groups in one molecule thereof, the $pKa_1$ (25° C.) being from 2.6 to 4.6, and the $pKa_2$ (25° C.) being from 3.8 to 5.4 include malonic acid, succinic acid, tartaric acid, malic acid, maleic acid, citric acid, fumaric acid, and phthalic acid. It is preferred that at least one acidic substance selected from malonic acid, succinic acid, tartaric acid, malic acid, maleic acid, and citric acid be contained in the second layer.

The acidic substance may be used alone, or in combination of two or more thereof.

The addition of the acidic substance to the film-forming liquid for forming the second layer may adjust the pH to 5.5 or less. The addition amount may be appropriately selected such that the pH of the second layer surface is 5.5 or less.

~pH~

As described above, in order to prevent mixing or bleeding of colors, the pH of the second layer surface is 5.5 or less, preferably 4.5 or less, more preferably 4.0 or less, and particularly preferably 3.7 or less.

The pH of the second layer surface is preferably 2.0 or more, and more preferably 2.5 or more, thereby avoiding safety problems during handling of the recording medium, and preventing the occurrence of printing failures such as bleeding of colors caused by the presence of an acid having a low pH in the second layer which makes the recording medium susceptible to damage during long-term storage.

The pH is measured according to an A method (coating method) of methods for measuring the film surface pH, which is determined by Japan Technical Association of the Pulp and Paper Industry (J. TAPPI), and a method that corresponds to, for instance, the A method and uses a paper surface pH measurement set "Form MPC" (trade name, manufactured by Kyoritsu Chemical-Check Lab., Corp.) is used to measure. In the form MPC, a test liquid is spread on a paper surface and a color thereof is compared with a reference color to measure.

—Water-Soluble Polyvalent Metal Compound—

The second layer preferably further contains at least one water-soluble polyvalent metal compound, thereby preventing bleeding with the passage of time. Examples of the water-soluble polyvalent metal compound include calcium, barium, manganese, copper, cobalt, nickel, aluminum, iron, zinc, zirconium, titanium, chromium, magnesium, tungsten, and molybdenum in the form of a water-soluble salt.

Specific examples include calcium acetate, calcium chloride, calcium formate, calcium sulfate, calcium lactate, barium acetate, barium sulfate, barium phosphate, manganese chloride, manganese acetate, manganese formate dihydrate, manganese sulfate ammonium hexahydrate, cupric chloride, copper (II) ammonium chloride dihydrate, copper sulfate, cobalt chloride, cobalt thiocyanate, cobalt sulfate, nickel sulfate hexahydrate, nickel chloride hexahydrate, nickel acetate tetrahydrate, ammonium nickel sulfate hexahydrate, amide nickel sulfate tetrahydrate, aluminum sulfate, aluminum sulfite, aluminum thiosulfate, aluminum polychloride, aluminum nitrate nonahydrate, aluminium chloride hexahydrate, aluminum lactate, ferrous bromide, ferrous chloride, ferric chloride, ferrous sulfate, ferric sulfate, zinc bromide, zinc chloride, zinc nitrate hexahydrate, zinc sulfate, zirconyl acetate, zirconyl nitrate, basic zirconium carbonate, zirconium hydroxide, ammonium zirconyl carbonate, potassium zirconyl carbonate, zirconyl sulfate, zirconyl fluoride, zirconyl chloride, zirconyl chloride octahydrate, zirconium oxychloride, zirconyl hydroxychloride, titanium chloride, titanium sulfate, chromium acetate, chromium sulfate, magnesium sulfate, magnesium chloride hexahydrate, magnesium citrate nonahydrate, magnesium lactate, sodium tungstophophate, sodium tungsten citrate, 12-tungstophosphoric acid n-hydrate, 12-tungstosilicic acid 26-hydrate, molybdenum chloride, and 12-molybdophosphoric acid n-hydrate.

The term "water-soluble" in the water-soluble polyvalent metal compound means that 1% by mass or more of the compound dissolves in water at ambient temperature and pressure.

Other preferred examples of the water-soluble aluminium compound include basic aluminum polyhydroxide compounds. The main component of the basic aluminum polyhydroxide compound is expressed by the formula 1, 2, or 3. The water-soluble aluminum polyhydroxide stably contains, for example, a basic and high molecular weight polynuclear condensed ion such as $[Al_6(OH)_{15}]^{3+}$, $[Al_8(OH)_{20}]^{4+}$, $[Al_{13}(OH)_{34}]^{5+}$, or $[Al_{21}(OH)_{60}]^{3+}$.

$$[Al_2(OH)_nCl_{6-n}]_m \qquad \text{Formula 1}$$

$$[Al(OH)_3]_nAlCl_3 \qquad \text{Formula 2}$$

$$Al_n(OH)_mCl_{(3n-m)} \; 0<m<3n \qquad \text{Formula 3}$$

These compounds are commercially available as water treating agents (trade name: ALUMINUM POLYCHLORIDE (PAC), manufactured by Taki Chemical Co., Ltd.) (trade name: ALUMINUM POLYHYDROXIDE (PAHO), manufactured by Asada Chemical Industry Co., Ltd.) (trade name: PURACHEM WT, manufactured by Riken Green Co., Ltd.). Other products of various grades for the same purpose are commercially and easily available from other manufacturers. In the invention, these commercial products may be used as they are. These basic aluminum polyhydroxide compounds are described in Japanese Patent Application Publication (JP-B) Nos. 3-24907 and 3-42591.

Among the above water-soluble polyvalent metal compounds, from the viewpoint of water resistance of the image, aluminium compounds and zirconium compounds are preferred, and among aluminium compounds, basic aluminum polyhydroxide compounds are preferred.

The addition amount of the water-soluble polyvalent metal compound is preferably from 0.1 to 10% by mass with reference to the total solid content of the second layer.

—Other Component—

The second layer may further contain other components such as a binder besides the above components.

The binder is not particularly limited, and may be selected from thermoplastic resins listed for the first layer.

~Water Absorption Measured by Bristow's Method~

In the invention, the surface of the second layer having a water absorption of from 2 ml/m$^2$ to 8 ml/m$^2$ at a contact time of 0.5 seconds as measured by the Bristow's method. When the water absorption is from 2 to 8 mL/m$^2$, the second layer has low permeability and thus retards the liquid absorption through the surface coated with a liquid such as an ink, thereby suppressing curling and preventing bleeding or mixing of colors. In other words, in the invention, if the water absorption is less than 2 mL/m$^2$ or more than 8 mL/m$^2$, bleeding or mixing of colors may occur.

Bleeding or mixing of colors is more effectively prevented when the pH of the second layer surface is adjusted to an acidic side (specifically pH 4 or less) as described above, or the below treatment liquid containing an acidic substance is used together with the ink.

The water absorption in the second layer is more preferably from 2 mL/m$^2$ to 4 mL/m$^2$ for the same reason as above.

The Bristow's method is used for quickly measuring the amount of liquid absorption, and has been adopted by JAPAN TAPPI. Details about the test method are described in "Method for determining the liquid absorbability of paper and board (Bristow's method)", J. TAPPI standard No. 51-87, and Japan Tappi Journal, 41 (8), 57-61 (1987). The measurement herein is made using the above test apparatus (Bristow tester) at a contact time of 0.5 seconds. Before the measurement, the slit width of the head box of the Bristow tester is adjusted to match the surface tension of the ink. The points where the ink passes through the paper are omitted from the calculation.

The thickness of the second layer is preferably from 3 μm to 50 μm, and more preferably from 4 μm to 40 μm. When the thickness of the second layer is 3 μm or more, deterioration of the water absorption in the second layer is prevented, and the occurrence of mixing or bleeding of colors is more effectively prevented. When the second layer has a thickness of 50 μm or less, it has superior handleability in terms of brittleness and scratch resistance.

(Other Layer)

The recording medium of the invention may further include other layer besides the first and second layers. The other layer may be selected as appropriate according to the intended use.

The specific recording medium in the invention may be produced by a common method. For example, the specific recording medium in the invention may be produced in accordance with the method described in the paragraphs 0086 to 0098 of JP-A No. 2009-125948.

[Ink Composition]

The ink composition in the invention contains at least one pigment, at least one water-soluble polymerizable monomer which is polymerized by actinic energy rays, and water, and may further contain, if necessary, other components such as a photopolymerization initiator, polymer particles, a dispersant, and a surfactant.

(Pigment)

The ink composition in the invention contains at least one pigment as a coloring material. The pigment is not particularly limited, and may be selected as appropriate according to the intended use. The pigment may be organic or inorganic. From the viewpoint of ink coloring properties, the pigment is preferably almost insoluble or poorly-soluble in water.

The pigment in the invention is not particularly limited as to its type, and may be selected from known organic and inorganic pigments.

Examples of the organic pigment include azo pigments, polycyclic pigments, dye chelates, nitro pigments, nitroso pigments, and aniline black. Among them, azo pigments and polycyclic pigments are more preferred. Examples of the azo pigments include azo lake pigments, insoluble azo pigments, condensed azo pigments, and chelate azo pigments. Examples of the polycyclic pigments include phthalocyanine pigments, perylene pigments, perinone pigments, anthraquinone pigments, quinacridone pigments, dioxazine pigments, indigo pigments, thio indigo pigments, isoindolinone pigments, and quinophthalone pigments. Examples of the dye chelates include basic dye chelates, and acidic dye chelates.

Examples of the inorganic pigments include titanium oxide, iron oxide, calcium carbonate, barium sulfate, aluminium hydroxide, barium yellow, cadmium red, chrome yellow, and carbon black. Among them, carbon black is particularly preferred. Examples of the carbon black include those produced by a known method such as a contact method, a furnace method, or a thermal method.

Specific examples of the pigment useful in the invention include the pigments described in the paragraphs [0142] to [0145] of JP-A No. 2007-100071.

These pigments may be used alone, or in combination of two or more selected from the same or different groups of the above ones.

~Dispersant~

The ink composition of the invention may contain at least one dispersant. The dispersant for the pigment may be a polymer dispersant or a low molecular weight surface active dispersant. The polymer dispersant may be soluble or insoluble in water.

The low molecular weight surface active dispersant stably disperses the pigment into an aqueous solvent while keeping the ink viscosity low. The low molecular weight surface active dispersant has a molecular weight of 2,000 or less. The molecular weight of the low molecular weight surface active dispersant is preferably from 100 to 2,000, and more preferably from 200 to 2,000.

The low molecular weight surface active dispersant has hydrophilic and hydrophobic groups. The surface active dispersant has at least one hydrophilic group and at least one hydrophobic group in one molecule thereof, and may have different kinds of hydrophilic and hydrophobic groups. The surface active dispersant may further have an appropriate linking group for linking the hydrophilic and hydrophobic groups.

The hydrophilic group may be anionic, cationic, nonionic, or betaine composed of any of them.

The anionic group is not particularly limited as long as it has a negative charge, and is preferably a phosphate group, a phosphonate group, a phosphinate group, a sulfate group, a sulfonate group, a sulfinate group, or a carboxylic group, more preferably a phosphate group or a carboxylic group, and even more preferably a carboxylic group.

The cationic group is not particularly limited as long as it has a positive charge, and is preferably an organic cationic substituent, more preferably a nitrogen or phosphorus cationic group, and even more preferably a pyridinium or ammonium cationic group.

Examples of the nonionic group include polyethylene oxide, polyglycerol, and a part of a sugar unit.

The hydrophilic group is preferably an anionic group. The anionic group is preferably a phosphate group, a phosphonate group, a phosphinate group, a sulfate group, a sulfonate group, a sulfinate group, or a carboxylic group, more preferably a phosphate group or a carboxylic group, and even more preferably a carboxylic group.

When the low molecular weight surface active dispersant has an anionic hydrophilic group, its pKa is preferably 3 or more, thereby accelerating the coagulation reaction. The pKa of the low molecular weight surface active dispersant is experimentally determined from a titration curve of a solution of the 1 mmol/L low molecular weight surface active dispersant dissolved in tetrahydrofuran-water (3:2=V/V) solution, titrated with an acidic or alkaline aqueous solution. When the pKa of the low molecular weight surface active dispersant is 3 or more, 50% or more of the anionic groups are theoretically undissociated state upon contact with a liquid having a pH of about 3. Therefore, the low molecular weight surface active dispersant has markedly poor water solubility, and causes coagulation. More specifically, coagulation reactivity increases. From this viewpoint, the low molecular weight surface active dispersant preferably has a carboxylic group as an anionic group.

The hydrophobic group preferably has a hydrocarbon, fluorocarbon, or silicon structure, and particularly preferably has a hydrocarbon structure. The hydrophobic group may be linear or branched. The hydrophobic group may be composed of a single chain or two more chains. When the hydrophobic group is composed of two more chains, two or more hydrophobic groups may be included.

The hydrophobic group is preferably a hydrocarbon group having 2 to 24 carbon atoms, more preferably a hydrocarbon group having 4 to 24 carbon atoms, and even more preferably a hydrocarbon group having 6 to 20 carbon atoms.

Among the polymer dispersants, a hydrophilic polymer compound can be used as the water-soluble dispersant. Examples of a natural hydrophilic polymer compound include vegetable polymers such as gum Arabic, gum tragacanth, gum guar, gum karaya, locust bean gum, arabinogalactan, pectin and quince seed starch; seaweed polymers such as alginic acid, carrageenan and agar; animal polymers such as gelatin, casein, albumin and collagen; and microbial polymers such as xanthene gum and dextran.

Examples of a modified hydrophilic polymer compound using a natural product as a raw material include cellulose polymers such as methyl cellulose, ethyl cellulose, hydroxyethyl cellulose, hydroxypropyl cellulose and carboxymethyl cellulose; starch polymers such as starch sodium glycolate and starch sodium phosphate ester; and seaweed polymers such as sodium alginate, propylene glycol alginate ester.

Examples of a synthetic water-soluble polymer compound include vinyl polymers such as polyvinyl alcohol, polyvinyl pyrrolidone and polyvinyl methyl ether; acrylic resins such as non-crosslinked polyacrylamide, polyacrylic acid or its alkali metal salt, and water-soluble styrene acrylic resin; water-soluble styrene maleic acid resins; water-soluble vinylnaphthalene acrylic resins; water-soluble vinylnaphthalene maleic resins; polyvinyl pyrrolidone, polyvinyl alcohol, alkali metal salts of β-naphthalenesulfonic acid formalin condensate; polymer compounds having a salt of a cationic functional group such as quaternary ammonium or amino group at a side chain; and natural polymers such as shellac.

Among these, one obtained by introducing a carboxy group like one made of a homopolymer of acrylic acid or methacrylic acid or a copolymer of acrylic acid or methacrylic acid with styrene or a monomer that has other hydrophilic group is particularly preferred as a polymer dispersing agent.

Of the polymer dispersants, as a non-water-soluble dispersant, a polymer having both a hydrophilic moiety and a hydrophobic moiety may be used. Examples of such a polymer include styrene-(meth)acrylic acid copolymer, styrene-(meth)acrylic acid-(meth)acrylic acid ester copolymer, (meth)acrylic acid ester-(meth)acrylic acid copolymer, polyethylene glycol (meth)acrylate-(meth)acrylic acid copolymer, vinyl acetate-maleic acid copolymer and styrene-maleic acid copolymer. The (meth)acrylic acid is an expression referring to an acrylic acid or methacrylic acid.

The polymer dispersant used in the invention has a weight average molecular weight of preferably from 3,000 to 100,000, more preferably from 5,000 to 50,000, further preferably from 5,000 to 40,000, and particularly preferably from 10,000 to 40,000.

The acid value of the polymer dispersant is preferably 180 mgKOH/g or less, thereby achieving good coagulation properties upon contact with the treatment liquid. The acid value is more preferably from 25 to 150 mgKOH/g, and even more preferably from 25 to 105 mgKOH/g. When the acid value of the polymer dispersant is 25 mgKOH/g or more, the pigment dispersion and ink composition have good stability.

The polymer dispersant preferably contains a carboxylic polymer, and more preferably a carboxylic polymer having an acid value of 25 to 150 mgKOH/g, from the viewpoints of dispersion stability and the coagulation rate upon contact with the treatment liquid.

The mixing mass ratio (p:s) between the pigment (p) and dispersant (s) is preferably from 1:0.06 to 1:3, more preferably from 1:0.125 to 1:1.5, and even more preferably from 1:0.125 to 1:0.7.

In the invention, from the viewpoints of light resistance and quality of the image, it is preferred that a pigment and a dispersant be contained, more preferred that an organic pigment and a polymer dispersant be contained, and particularly preferred that an organic pigment and a carboxylic polymer dispersant be contained.

From the viewpoint of coagulation properties, the pigment is preferably a water-dispersible pigment whose surface is at least partially coated with a polymer dispersant, and more preferably a water-dispersible pigment whose surface is at least partially coated with a carboxylic polymer dispersant.

The water-dispersible pigment whose surface is at least partially coated with a polymer dispersant may be produced by, for example, dispersing a mixture containing a pigment, a dispersant, water, and if necessary a solvent (preferably an organic solvent), using a disperser.

The pigment dispersion may be produced in the form of a dispersion through the steps of, for example, adding an aqueous solution containing a basic substance to a mixture of the above pigment, water-insoluble polymer dispersant, and an organic solvent for dissolving or dispersing the dispersant (mixing and hydration step), and then removing the organic solvent (solvent removal step). As a result of which, a pigment particle dispersion containing a finely dispersed pigment and having good storage stability may be produced.

The organic solvent must dissolve or disperse the dispersant, and preferably has a certain affinity for water. More specifically, the organic solvent preferably has a water solubility of from 10% by mass to 50% by mass at 20° C.

More specifically, the pigment particle dispersion may be produced through the following steps (1) and (2), but the method will not limited to this example.

Step (1): a step of dispersing a pigment, a dispersant, and an organic solvent for dissolving or dispersing the dispersant, together with a mixture containing a solution composed mainly of water and containing a basic substance.

Step (2): a step of removing at least a portion of the organic solvent from the mixture after dispersion treatment.

In the step (1), firstly, the dispersant is dissolved or dispersed in an organic solvent to obtain a mixture (mixing step). Secondly, a solution composed mainly of water and containing a pigment and a basic substance, and water and a surfactant if necessary are added to the mixture, mixed, and dispersed, thereby obtaining an oil-in-water dispersion.

The basic substance is used for neutralization of anionic groups (preferably carboxy groups) which may be contained in the polymer. The degree of neutralization of the anionic groups is not particularly limited. In usual cases, the dispersion of the coloring material particles to be finally obtained is preferably has a pH of, for example, 4.5 to 10. The pH may be adjusted according to the desired degree of neutralization of the polymer.

Preferred examples of the organic solvent include alcohol solvents, ketone solvents, and ether solvents. Examples of the alcohol solvents include ethanol, isopropanol, n-butanol, tertiary butanol, isobutanol, and diacetone alcohol. Examples of the ketone solvents include acetone, methyl ethyl ketone, diethyl ketone, and methyl isobutyl ketone. Examples of the ether solvents include dibutyl ether, tetrahydrofuran, and dioxane. Among these solvents, isopropanol, acetone, and methyl ethyl ketone are preferred, and methyl ethyl ketone is particularly preferred. The organic solvent may be used alone or in combination of two or more thereof.

In the production process of the pigment particle dispersion, kneading and dispersing treatment may be carried out by strong shearing force applied using, for example, a double roll, a triple roll, a ball mill, a tron mill, a disperser, a kneader, a cokneader, a homogenizer, a blender, a monoaxis or biaxial extruder. Details about the kneading and dispersion are described in "Paint Flow and Pigment Dispersion" written by T. C. Patton (1964, published by John Wiley and Sons, Inc.).

If necessary, the dispersion may be produced by fine dispersion treatment in, for example, a vertical or horizontal sand grinder, a pin mill, a slit mill, an ultrasonic disperser, or a high pressure disperser, using glass or zirconia beads having a particle size of 0.01 to 1 mm.

In the production process of the pigment dispersion, the method for removing the organic solvent is not particularly limited, and may use a known method such as vacuum distillation.

The pigment dispersion thus obtained contains sufficiently dispersed pigment particles, and the pigment particle dispersion has good stability over time.

The average particle size of the pigment is preferably from 10 to 200 nm, more preferably from 10 to 150 nm, and even more preferably from 10 to 100 nm. When the average particle size is 200 nm or less, good color reproducibility and good droplet ejection properties are achieved under the ink jet method. In addition, when the average particle size is 10 nm or more, good light resistance is achieved. The particle size distribution of the coloring material is not particularly limited, and may be a wide particle size distribution or monodispersion. Two or more coloring materials having monodispersed particle size distributions may be used in combination.

The average particle size and particle size distribution of the pigment particles are determined by measuring the volume average particle size using the NANOTRAC particle size distribution analyzer UPA-EX150 (trade name, manufactured by Nikkiso Co., Ltd.) under the dynamic light scattering method.

The pigment may be used alone or in combination of two or more thereof.

From the viewpoint of image density, the pigment content in the ink composition is preferably from 1 to 25% by mass, more preferably from 1.5 to 20% by mass, and even more preferably from 1.8 to 5.5% by mass, with reference to the ink composition.

(Polymerizable Monomer)

The ink composition of the invention contains at least one water-soluble polymerizable monomer which is polymerized by actinic energy rays. The polymerizable monomer is used in combination with the pigment, and is dispersed among the particles during coagulation upon contact with the treatment liquid, and reinforces the image by subsequent polymerization.

The term "water-soluble" means that the monomer is able to be dissolved in water above a certain concentration, and soluble (desirably uniformly) in an aqueous ink. Alternatively, the monomer may be soluble (desirably uniformly) in an ink with the addition of the below water-soluble organic solvent which improves the solubility of the monomer. More specifically, the water solubility of the monomer is preferably 2% by mass or more, more preferably 20% by mass or more, and particularly preferably the monomer is uniformly miscible with water at any ratio.

The polymerizable monomer is preferably a nonionic polymerizable monomer because it will not inhibit the reaction between an acidic substance contained in the second layer, a coagulant, which is added to the treatment liquid if necessary, and a pigment. The water solubility of the polymerizable monomer is preferably 10% by mass or more (more preferably 15% by mass or more).

Examples of the nonionic polymerizable monomer include polymerizable monomers such as acrylic monomers.

Examples of the acrylic monomers include UV curable monomers and oligomers such as (meth)acrylates of polyhydric alcohols, glycidyl ether (meth)acrylates of polyhydric alcohols, (meth)acrylates of polyethylene glycols, (meth)acrylates of polyhydric alcohol ethylene oxide adducts, and reaction products of polybasic acid anhydrides and hydroxylic (meth)acrylates.

The chain of the polyhydric alcohol may be elongated internally by an ethylene oxide chain by the addition of ethylene oxide.

Specific examples of the nonionic polymerizable monomer (nonionic compounds 1 to 4) are shown below. However, the invention will not limited to these examples.

Nonionic compound 1

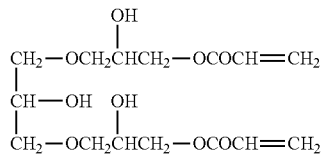

Nonionic compound 2

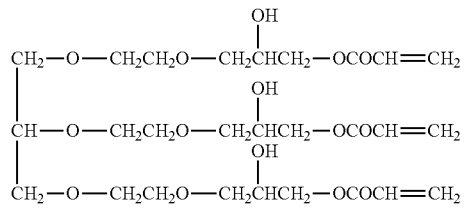

Nonionic compound 3

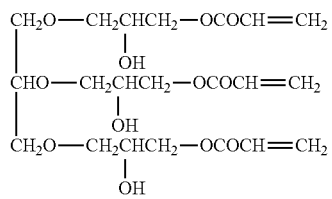

Nonionic compound 4

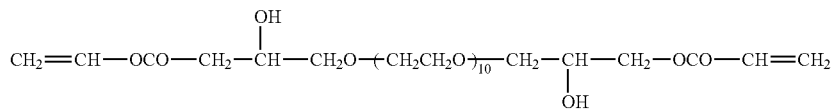

Other examples include acrylates having two or more acryloyl groups in one molecule derived from polyhydric compounds. Examples of the polyhydric compounds include glycol condensates, oligoethers, and oligoesters.

Other preferred examples of the nonionic polymerizable monomer include acrylates and methacrylates of polyols having two or more hydroxyl groups, such as monosaccharides, and disaccharides; and (meth)acrylates of triethanolamine, diethanolamine, trishydroxyaminomethane, and trishydroxyaminoethane. Specific examples of these compounds (nonionic compounds a to k) are shown below. However, the invention will not be limited to them.

(a)

(b)

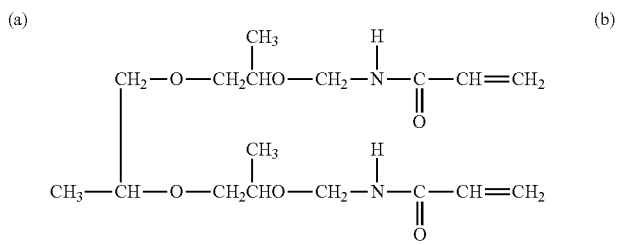

(c)

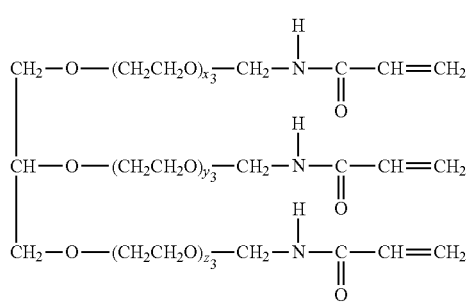

$x_3 + y_3 + z_3 = 6$

-continued
(d)
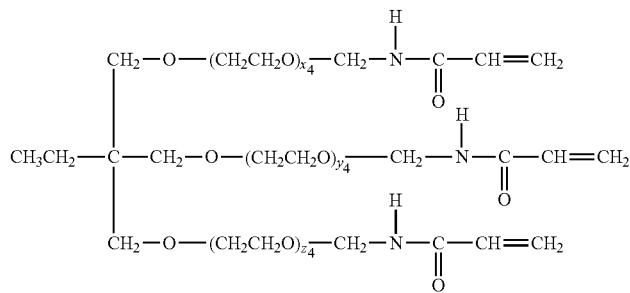
$x_4 + y_4 + z_4 = 9$
(e)
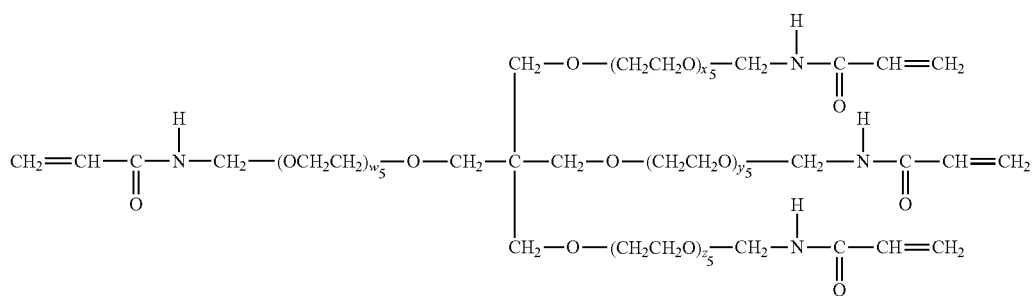
$w_5 + x_5 + y_5 + z_5 = 6$
(f)
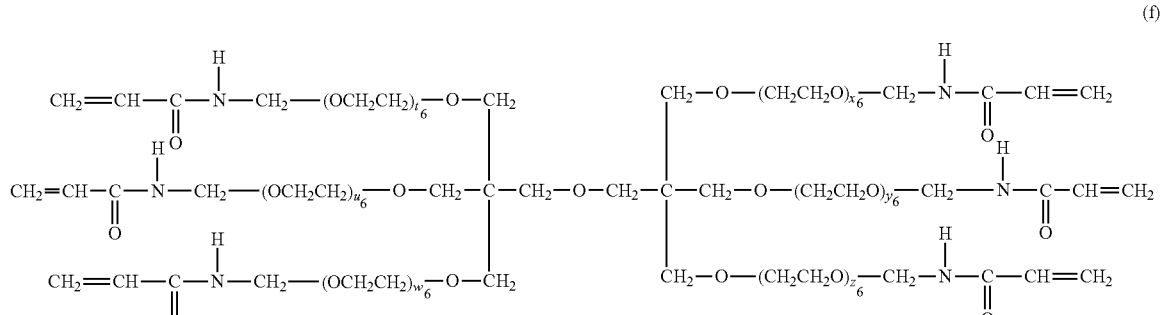
$t_6 + u_6 + w_6 + x_6 + y_6 + z_6 = 12$
(g)
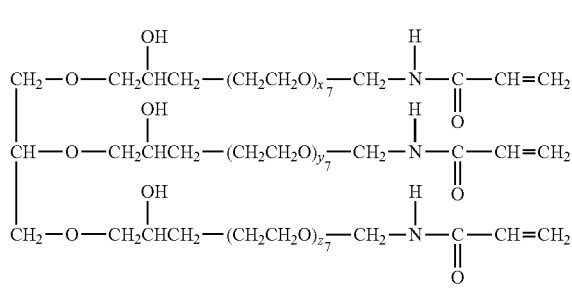
$x_7 + y_7 + z_7 = 3$
(h)
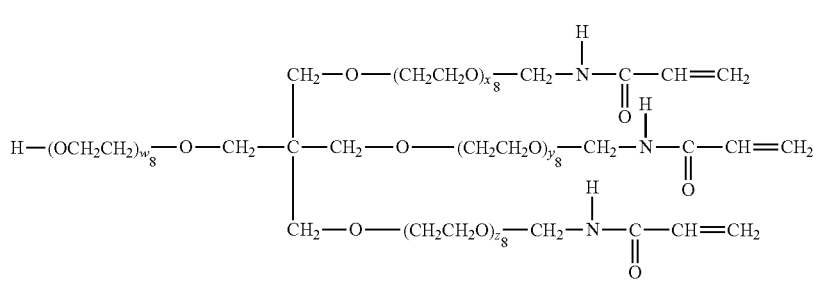
$w_8 + x_8 + y_8 + z_8 = 6$

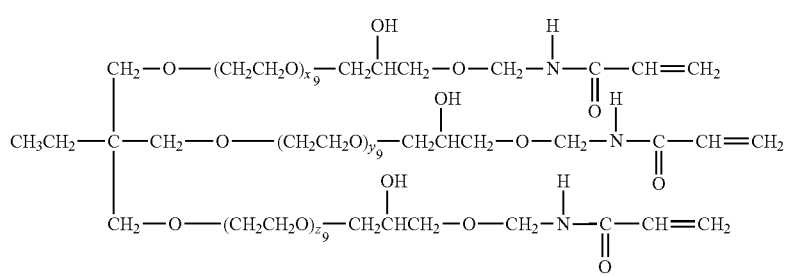

(i)

$x_9 + y_9 + z_9 = 3$

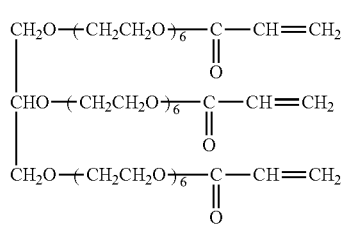

(j)

(k)

In order to improve scratch resistance, the polymerizable monomer in the invention is preferably a polyfunctional monomer, and more preferably a bifunctional to hexafunctional monomer. In order to achieve solubility and scratch resistance, the polymerizable monomer is preferably a bifunctional to tetrafunctional monomer.

The polymerizable monomer may be used alone or in combination of two or more thereof.

The content of the polymerizable monomer in the ink composition is preferably from 4 to 30% by mass, and more preferably from 10 to 22% by mass.

The content of the polymerizable monomer with reference to the solid content of the pigment is preferably pigment: polymerizable monomer=1:1 to 1:30, and more preferably 1:3 to 1:15. When the ratio of the polymerizable monomer content to the pigment content is 1 or more, the image strength is further improved and the image has high scratch resistance, and when the ratio is 30 or less, an advantageous pile height is achieved.

(Initiator)

The ink composition in the invention preferably contains at least one initiator, and more preferably at least one photopolymerization initiator which may initiate the polymerization of the polymerizable monomer by actinic energy rays. The initiator may be used alone or in combination of two or more thereof, or together with a sensitizer.

The initiator may be selected as appropriate from the compounds which may initiate polymerization reaction by actinic energy rays, and may be, for example, an initiator which generates an active species (for example, a radical, acid, or base) by radiation, light, or electron beams (for example, a photopolymerization initiator).

Examples of the photopolymerization initiator include acetophenone, 2,2-diethoxyacetophenone, p-dimethylaminoacetophenone, p-dimethylaminopropiophenone, benzophenone, 2-chlorobenzophenone, p,p'-dichlorobenzophene, p,p'-bisdiethylaminobenzophenone, Michler ketone, benzyl, benzoin, benzoin methyl ether, benzoin ethyl ether, benzoin isopropyl ether, benzoin n-propyl ether, benzoin isobutyl ether, benzoin n-butyl ether, benzyl dimethylketal, tetramethylthiuram monosulfide, thioxanthone, 2-chlorothioxanthone, 2-methylthioxanthone, azobisisobutyronitrile, benzoin peroxide, di-tert-butyl peroxide, 1-hydroxycyclohexylphenyl ketone, 1-[4-(2-hydroxy ethoxy)-phenyl]-2-hydroxy-2-methyl-1-propane-1-one, 2-hydroxy-2-methyl-1-phenyl-1-one, 1-(4-isopropylphenyl)-2-hydroxy-2-methylpropane-1-one, and methylbenzoyl formate. Other examples include aromatic diazonium salts, aromatic halonium salts, aromatic sulfonium salts, and metallocene compounds such as triphenyl sulfonium hexafluorophosphate, and diphenyl iodonium hexafluoro antimonate.

When an initiator is used, the content of the initiator in the ink composition is preferably from 1 to 40% by mass, and more preferably from 5 to 30% by mass, with reference to the polymerizable compound. When the initiator content is 1% by mass or more, the image has further improved scratch resistance and is advantageous for high-speed recording. When the content is 40% by mass or less, advantageous ejection stability is achieved.

Examples of the sensitizer include amines (such as aliphatic amines, aromatic amines, and piperidine), ureas (such as allylthiourea and o-tolylthiourea), sulfur compounds (such as sodium diethyl dithiophosphate, and soluble salts of aromatic sulfinic acid), nitrile compounds (such as N,N-disubstituted p-aminobenzonitrile), phosphorus compounds (such as tri-n-butylphosphine, and sodium diethyl dithiophosphate), nitrogen compounds (such as Michler ketone, N-nitrosohydroxylamine derivatives, oxazolidine compounds, tetrahydro-1,3-oxazine compounds, and condensates of formaldehyde or acetaldehyde and diamine), chlorine compounds (such as carbon tetrachloride and hexachloroethane), polymer amines of the reaction product between an epoxy resin and an amine, and triethanolamine triacrylate.

The sensitizer may be added in an amount which will not impair the effect of the invention.

(Aqueous Medium)

The ink composition of the invention contains an aqueous medium. The aqueous medium contains at least water, and, if necessary, at least one organic solvent.

The water of the invention is preferably free from ionic impurities, such as ion-exchanged water or distilled water. The water content in the ink composition may be selected according to the intended use, and in usual cases, the content is preferably from 10 to 95% by mass, and more preferably from 30 to 90% by mass.

—Organic Solvent—

The aqueous medium of the invention preferably contains at least one water-soluble organic solvent, thereby preventing drying and accelerating wetting or permeation. In order to prevent drying, the water-soluble organic solvent preferably works as a drying preventive agent which prevents clogging of the ink ejection ports of the injection nozzle caused by adhesion, drying, and coagulation of the ink. In order to prevent drying and accelerate wetting, the water-soluble organic solvent preferably has a lower vapor pressure than water. The water-soluble organic solvent may be used as a permeation accelerator for improving ink permeation into the paper.

Examples of the water-soluble organic solvent include alkanediols (polyhydric alcohols) such as glycerol, 1,2,6-hexanetriol, trimethylolpropane, ethylene glycol, and propylene glycol; sugar alcohols; alkyl alcohols having 1 to 4 carbon atoms, such as ethanol, methanol, butanol, propanol, and isopropanol; and glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monoethyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol, dipropylene glycol monomethyl ether, dipropylene glycol monoethyl ether, dipropylene glycol mono-n-propyl ether, dipropylene glycol mono-iso-propyl ether, and tripropylene glycol monomethyl ether. These solvents may be used alone or in combination of two or more thereof.

The drying inhibitor is preferably a water-soluble organic solvent having vapor pressure lower than that of water. Specific examples of the drying inhibitor include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylolpropane; lower alkyl ethers of polyhydric alcohol, such as ethylene glycol monomethyl (or ethyl)ether, diethylene glycol monomethyl (or ethyl) ether and triethylene glycol monoethyl (or butyl)ether; heterocycles such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulforene; polyfunctional compounds such as diacetone alcohol and diethanolamine; and urea derivatives. Above all, polyhydric alcohols such as glycerin and diethylene glycol are preferred as the drying inhibitor. Those drying inhibitors may be used alone or as mixtures of two kinds or more thereof. Those drying inhibitors are preferably contained in an amount of from 10 to 50% by mass in the ink.

The water-soluble organic solvent as the permeation accelerator is preferably used for the purpose of well permeating the ink into a recording medium (printing paper). Specific examples of the permeation accelerator include alcohols such as ethanol, isopropanol, butanol, di(tri)ethylene glycol monobutyl ether and 1,2-hexanediol; sodium lauryl sulfate, sodium oleate and nonionic surfactants.

Those permeation accelerators may be used alone or as mixtures of two kinds or more thereof. The permeation accelerators are preferably contained in the ink composition in an amount of from 5 to 30% by mass. The permeation accelerator is preferably used within a range of the addition amount such that bleeding of printing and print-through are not generated.

The water-soluble organic solvent can be used to adjust viscosity, other than the above. Specific examples of the water-soluble organic solvent that can be used to adjust viscosity include alcohols (for example, methanol, ethanol, propanol, isopropanol, butanol, isobutanol, sec-butanol, t-butanol, pentanol, hexanol, cyclohexanol and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether), amines (for example, ethanolamine, diethanolamine, triethanolamine, N-methyl diethanolamine, N-ethyl diethanolamine, morpholine, N-ethylmorpholine, ethylene diamine, diethylene triamine, triethylene tetramine, polyethylene imine and tetramethylpropylene diamine), and other polar solvents (for example, formaldehyde, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone).

The water-soluble organic solvent may be used alone or as mixtures of two kinds or more thereof.

(Polymer Particles)

The ink composition of the invention preferably contains at least one type of polymer particles. The polymer particles effectively improve fixability of the ink composition on the recording medium, abrasion resistance of the image, and blocking resistance.

The polymer particles preferably coagulate or disperses to be destabilized to thicken the ink upon contact with the above treatment liquid or the region on the recording medium where the treatment liquid has been dried, thereby fixing the ink composition, or the image. The polymer particles are preferably dispersed in at least one type of water and/or organic solvents.

Examples of the polymer particles of the invention include acrylic resins, vinyl acetate resins, styrene-butadiene resins, vinyl chloride resins, acryl-styrene resins, butadiene resins, styrene resins, crosslinked acrylic resins, crosslinked styrene resins, benzoguanamine resins, phenolic resins, silicone resins, epoxy resins, urethane resins, paraffin resins, fluorocarbon resins, and latexes thereof. Among them, preferred examples are acrylic resins, acryl-styrene resins, styrene resins, crosslinked acrylic resins, and crosslinked styrene resins.

The polymer particles may be in the form of a latex.

The weight average molecular weight of the polymer particles is preferably from 10000 to 200000, and more preferably from 100000 to 200000.

The volume average particle size of the polymer particles is preferably from 10 nm to 1 μm, more preferably from 10 nm to 200 nm, even more preferably from 20 nm to 100 nm, and particularly preferably from 20 nm to 50 nm.

The glass transition temperature Tg of the polymer particles is preferably 30° C. or higher, more preferably 40° C. or higher, and even more preferably 50° C. or higher.

The addition amount of the polymer particles is preferably from 0.1 to 20% by mass, more preferably from 0.1 to 20% by mass, and even more preferably from 0.1 to 15% by mass, with reference to the ink.

The particle size distribution of the polymer particles is not particularly limited, and may be a wide particle size distribution or monodispersion. Two or more types of polymer particles having monodispersed particle size distributions may be used in combination.

(Other Additives)

Examples of other additives used in the invention include conventional additives such as drying inhibitor (wetting agent), color fading inhibitor, emulsion stabilizer, permeation accelerator, ultraviolet absorber, preservative, mildew-proofing agent, pH adjusting agent, surface tension regulator, defoamer, viscosity regulator, dispersant, dispersion stabilizer, anti-rust agent and chelating agent.

The various kinds of the additives, in the case of an aqueous ink, are added directly to the ink. In the case where an oil-soluble dye is used in the form of a dispersion, it is general that, after a dye dispersion is prepared, the additive is added to the dispersion. However, during preparation of the dye dispersion, the additive may be added to an oil phase or an aqueous phase.

The ultraviolet absorber is used for the purpose of improving preservability of an image. The ultraviolet absorber can use benzotriazole compounds described in, for example, JP-A Nos. 58-185677, 61-190537, 2-782, 5-197075 and 9-34057; benzophenone compounds described in, for example, JP-A Nos. 46-2784 and 5-194483, and U.S. Pat. No. 3,214,463; cinnamic acid compounds described in, for example, JP-B Nos. 48-30492 and 56-21141, and JP-A No. 10-88106; triazine compounds described in, for example, JP-A Nos. 4-298503, 8-53427, 8-239368 and 10-182621, and JP-A No. 8-501291; compounds described in Research Disclosure No. 24239; and compounds that absorb ultraviolet light and emit fluorescence, i.e., fluorescent brighteners, represented by stilbene compounds or benzoxazole compounds.

The color fading inhibitor is used for the purpose of improving storability of an image. Examples of the color fading inhibitor that can be used include various organic color fading inhibitors and metal complex color fading inhibitors. Examples of the organic color fading inhibitor include hydroquinones, alkoxyphenols, dialkoxyphenols, phenols, anilines, amines, indanes, chromanes, alkoxyanilines and heterocycles. Examples of the metal complex color fading inhibitor include a nickel complex and a zinc complex. More specifically, compounds described in the patents cited in Research Disclosure No. 17643, chapter VII, items I to J; Research Disclosure No. 15162; Research Disclosure No. 18716, page 650, the left-hand column; Research Disclosure No. 36544, page 527; Research Disclosure No. 307105, page 872; and Research Disclosure No. 15162, and compounds included in the formulae of the representative compounds and the exemplified compounds described on pages 127 to 137 of JP-A No. 62-215272 can be used.

Examples of the mildew-proofing agent include sodium dehydroacetate, sodium benzoate, sodium pyridinethion-1-oxide, p-hydroxybenzoic acid ethyl ester, 1,2-benzisothiazolin-3-one and its salt. Those are preferably used in the ink composition in an amount of from 0.02 to 1.00% by mass.

As the pH regulator, a neutralizer (organic base and inorganic alkali) may be used. The pH regulator may be added in an amount such that the inkjet ink composition has pH of preferably from 6 to 10, and more preferably from 7 to 10, for the purpose of improving storage stability of the inkjet ink composition.

Examples of the surface tension regulator include nonionic surfactants, cationic surfactants, anionic surfactants and betaine surfactants.

The surface tension regulator is added in an amount such that the surface tension of the ink composition is adjusted to preferably from 20 to 60 mN/m, more preferably from 20 to 45 mN/m, and further preferably from 25 to 40 mN/m, in order to well eject the ink composition by an inkjet method.

Specific examples of the surfactant as a hydrocarbon type preferably include anionic surfactants such as fatty acid salts, alkyl sulfate ester salts, alkyl benzene sulfonates, alkyl naphthalene sulfonates, dialkyl sulfosuccinates, alkyl phosphate ester salts, naphthalenesulfonic acid-formalin condensates and polyoxyethylene alkyl sulfate ester salts; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester and oxyethylene oxypropylene block copolymer. Olfine (trade name, products of Nissin Chemical Industry Co., Ltd) and SURFYNOLS (trade name, products of Air Products & Chemicals) which are an acetylene type polyoxyethylene oxide surfactant are preferably used. Furthermore, amine oxide type amphoteric surfactants such as N,N-dimethyl-N-alkyl amine oxide are preferred.

Additionally, materials described on pages (37) to (38) of JP-A No. 59-157636 and Research Disclosure No. 308119 (1989) as surfactants can be used.

When fluorine (alkyl fluoride type) surfactants, silicone surfactants and the like, such as those described in JP-A Nos. 2003-322926, 2004-325707 and 2004-309806 are used, scratch fastness can be improved.

The surface tension regulator may be used as an anti-foaming agent, and fluorine compounds, silicon compounds and chelating agents such as EDTA may be also used.

EXAMPLES

The present invention is illustrated below with reference to examples, but the invention will not limited to these examples. Unless otherwise noted, "part" and "%" are based on the mass.

<Making of Recording Medium 1>

(Preparation of Coating Liquid A for Forming the First Layer)

100 parts of kaolin (trade name: KAOBRIGHT 90, manufactured by Shiraishi Calcium Kaisha, Ltd), 3.8 parts of 0.1 N sodium hydroxide (manufactured by Wako Pure Chemical Industries, Ltd.), 1.3 parts of 40% sodium polyacrylate (trade name: ARON T-50, manufactured by Toagosei Co., Ltd.), and 49.6 parts of water were mixed, dispersed using a non-bubbling kneader (trade name: NBK-2, manufactured by Nippon Seiki Co., Ltd.), and thus obtaining a 65% kaolin dispersion liquid. Subsequently, to 100 parts of a 22.5% polyester urethane latex aqueous dispersion (glass transition temperature 49° C., lowest film-forming temperature 29° C.; trade name: HYDRAN AP-40F, manufactured by Dainippon Ink And Chemicals, Incorporated), 5 parts of water, and 7.0 parts of the 65% kaolin dispersion liquid obtained above, and 0.8 parts of 10% EMULGEN 109P (trade name, manufactured by Kao Corporation) were added, thoroughly mixed while stirred, and then the temperature of the mixed solution thus obtained was kept at 15 to 25° C., thereby obtaining a coating liquid A for forming the first layer having a final solid concentration of 24.0%.

(Preparation of Coating Liquid a for Forming the Second Layer)

100 parts of kaolin (trade name: KAOBRIGHT 90, manufactured by Shiraishi Calcium Kaisha, Ltd) and 1.3 parts of 40% sodium polyacrylate (trade name: ARON T-50, manufactured by Toagosei Co., Ltd.) were mixed, and dispersed into water. To the dispersion, 100 parts of a 7% PVA245 (trade name, manufactured by Kuraray Co., Ltd.) aqueous solution and 3.5 parts of a 10% EMULGEN 109P (trade name, manufactured by Kao Corporation) aqueous solution were added, and nitric acid was further added such that the surface the coated second layer had a pH of 3.5, thereby obtaining a coating liquid a for forming the second layer having a final solid concentration of 27%.

(Formation of First Layer)

The coating liquid A for forming the first layer was applied to each side of a fine paper (trade name: SHIRAOI, manufactured by Nippon Paper Group, Inc.) having a basis weight 81.4 g/m², using an extrusion die coater such that the coating weight for one side was 8.0 g/m², and dried for 1 minute at 85° C. and a wind speed of 15 m/second, thereby forming the first layer. Further, the first layer was subjected to soft calendering treatment as described below. The first layer thus obtained had a thickness of 8.1 μm.

—Soft Calender Treatment—

To a high-quality paper on a surface of which a first layer was formed, by use of a soft calender provided with a roll pair where a metal roll and a resin roll are paired, under conditions of a surface temperature of the metal roll of 50° C. and nip pressure of 50 kg/cm, a soft calender process was applied.

(Formation of Second Layer)

The coating liquid a for forming the second layer was applied to each side of the fine paper having the first layer, using an extrusion die coater such that the dry mass for one side was 20 g/m², and dried for 1 minute at 70° C. and a wind speed of 10 m/second, thereby forming the second layer. Further, the second layer was subjected to calendering treatment in the same manner as described above. The second layer thus obtained had a thickness of 20.2 μm.

In this manner, a recording medium 1 was made.

<Production of Recording Media 2 to 9>

Recording media 2 to 9 were produced in the same manner as the recording medium 1, except that the acidic substances listed in Table 1 were used in place of nitric acid.

<Making of Recording Medium 10>

A recording medium 10 was made in the same manner as the recording medium 6, except that 6.0 parts of a basic aluminum polyhydroxide (trade name: PURACHEM WT, manufactured by Riken Green Co., Ltd.) [water-soluble polyvalent metal compound] was further added to the coating liquid a for forming the second layer.

<Making of Recording Medium 11>

A recording medium 11 was made in the same manner as the making of the recording medium 6, except that 6.0 parts of zirconyl acetate (trade name: ZIRCOSOLZA-20, manufactured by Daiichi Kigenso Kagaku Kogyo Co., Ltd.) [water-soluble polyvalent metal compound] was further added to the coating liquid a for forming the second layer.

<Making of Recording Medium C1>

A recording medium C1 was made in the same manner as in Example 1, except that the coating weight of the first layer in the making of recording medium 1 was changed to 4 g/m².

<Making of Recording Medium C2>

A recording medium C2 was made in the same manner as the recording medium 1, except that kaolin (trade name: KAOBRIGHT 90, manufactured by Shiraishi Calcium Kaisha, Ltd) contained in the coating liquid a for forming the second layer was changed to titanium oxide (trade name: TIPAQUE 8280, manufactured by Ishihara Sangyo Kaisha, Ltd.).

<Making of Recording Medium C3>

A recording medium C3 was made in the same manner as the recording medium 1, except that nitric acid was added to the coating liquid a for forming the second layer thereby adjusting the surface pH of the second layer to 6.0.

<Making of Recording Medium C4>

A recording medium C4 was made in the same manner as the recording medium 1, except that nitric acid was not added to the coating liquid a for forming the second layer.

<Making of Recording Medium C5>

A recording medium C5 was made in the same manner as the recording medium 1, except that the dry mass of one side of the second layer was changed to 10 g/m².

<Evaluation of Recording Medium>

The recording media thus obtained were subjected to the following evaluations 1 and 2. The evaluation results are listed in Table 1.

—1. Cobb's Water Absorbency Test for the First Layer—

According to the Cobb's water absorbency test based on JIS P8140, at a surface of a first layer of a high-quality paper on which a first layer was formed, the Cobb's water absorbency (a permeating amount of water when water was brought into contact at 20° C. for 120 seconds (g/m²)) was measured.

—2. Water Absorption Test for the Second Layer—

The water absorption was measured as follows in accordance with the Bristow's method.

The ink jet recording medium obtained above was cut into A6 size pieces to make a sample piece of the second layer. The sample piece was mounted on a measuring table and was brought into contact with a head filled with a test liquid, and then the helical scanning line from the inside to outside was automatically scanned, thereby measuring the liquid absorption properties. The measuring table was rotated with its rotation speed (the contact time of paper and ink) changed stepwise, thereby examining the relationship between the contact time and water absorption amount. Table 1 lists the water absorption at a contact time of 0.5 seconds.

TABLE 1

| | Acidic substance | Water-soluble polyvalent metal compound | Cobb water absorption degree (g/m²) | Water absorption in the second layer (ml/m²) | Surface pH |
|---|---|---|---|---|---|
| Recording medium 1 | nitric acid | — | 0.9 | 3.7 | 3.5 |
| Recording medium 2 | lactic acid | — | 0.9 | 3.6 | 3.5 |
| Recording medium 3 | tartaric acid | — | 0.8 | 3.7 | 3.5 |
| Recording medium 4 | malic acid | — | 1.0 | 3.7 | 3.5 |
| Recording medium 5 | malonic acid | — | 1.0 | 3.6 | 3.5 |
| Recording medium 6 | citric acid | — | 1.0 | 3.7 | 3.5 |
| Recording medium 7 | fumaric acid | — | 0.8 | 3.6 | 3.5 |
| Recording medium 8 | maleic acid | — | 0.9 | 3.6 | 3.5 |

TABLE 1-continued

| | Acidic substance | Water-soluble polyvalent metal compound | Cobb water absorption degree (g/m²) | Water absorption in the second layer (ml/m²) | Surface pH |
|---|---|---|---|---|---|
| Recording medium 9 | succinic acid | — | 0.8 | 3.8 | 3.5 |
| Recording medium 10 | citric acid | Basic poly-aluminum chloride | 0.9 | 3.9 | 3.5 |
| Recording medium 11 | citric acid | zirconyl acetate | 1.0 | 3.6 | 3.5 |
| Recording medium C1 | nitric acid | — | 4.8 | 3.8 | 3.5 |
| Recording medium C2 | nitric acid | — | 0.9 | 10.8 | 3.5 |
| Recording medium C3 | nitric acid | — | 1.0 | 3.6 | 6.0 |
| Recording medium C4 | — | — | 1.0 | 3.6 | 7.2 |
| Recording medium C5 | nitric acid | — | 0.9 | 1.7 | 3.5 |

<Preparation of Ink Composition>
<<Preparation of Cyan Ink A>>
—Preparation of Cyan Dispersion Liquid—

In a reaction vessel, 6 parts of styrene, 11 parts of stearyl methacrylate, 4 parts of styrene macromer AS-6 (trade name, manufactured by Toagosei Co., Ltd.), 5 parts of BLEMMER PP-500 (trade name, manufactured by N of Corporation), 5 parts of methacrylic acid, 0.05 parts of 2-mercaptoethanol, and 24 parts of methyl ethyl ketone were placed, and thus making a mixed solution.

Aside from this, in a dropping funnel, 14 parts of styrene, 24 parts of stearyl methacrylate, 9 parts of styrene macromer AS-6 (trade name, manufactured by Toagosei Co., Ltd.), 9 parts of BLEMMER PP-500 (trade name, manufactured by N of Corporation), 10 parts of methacrylic acid, 0.13 parts of 2-mercaptoethanol, 56 parts of methyl ethyl ketone, and 1.2 parts of 2,2'-azobis(2,4-dimethylvaleronitrile) were placed, and thus preparing a mixed solution.

The mixed solution in the reaction vessel was heated to 75° C. while stirred in a nitrogen atmosphere, to which the mixed solution in the dropping funnel was added dropwise over a period of 1 hour. After 2 hours from the completion of the addition, a solution prepared by dissolving 1.2 parts of 2,2'-azobis(2,4-dimethylvaleronitrile) in 12 parts of methyl ethyl ketone was added dropwise over a period of 3 hours, and then aged at 75° C. for 2 hours and 80° C. for 2 hours, thereby obtaining a polymer dispersant solution.

The solvent was removed from a portion of the polymer dispersant solution, and the solid content obtained was diluted with tetrahydrofuran to 0.1% by mass, and measured for the weight average molecular weight using high speed GPC (gel permeation chromatography) HLC-8220GPC with three columns TSK GEL SUPER HZM-H, TSK GEL SUPER HZ4000, and TSK GEL SUPER HZ2000 (trade name, manufactured by Tosoh Corporation), which were connected serially. As a result, the weight average molecular weight was 25,000 in terms of polystyrene, and the acid value was 100 mgKOH/g.

Subsequently, a portion of the polymer dispersant solution containing 5.0 g of the polymer dispersant in terms of the solid content, 10.0 g of a cyan pigment BLUE 15:3 (trade name, manufactured by Dainichiseika Color & Chemicals Mfg. Co., Ltd.), and methyl ethyl ketone in an amount to make the total 45.0 g were mixed, and fed into a vessel together with 8.0 g of a 1 mol/L sodium hydroxide aqueous solution, 82.0 g of ion-exchanged water, and 300 g of 0.1-mm zirconia beads, and dispersed using a batch-type sand grinder having four parallel cylinders (trade name: LS G-4U-08, manufactured by Aimex Co., Ltd.), at 1000 rpm to 1200 rpm until the volume average particle size became 100 nm. The dispersion liquid was concentrated using an evaporator under reduced pressure until methyl ethyl ketone was sufficiently evaporated, further concentrated until the pigment concentration became 10%, and thus obtaining a cyan dispersion liquid containing a dispersed water-dispersible pigment.

After the cyan dispersion liquid was prepared as described above, the following components were mixed to make a cyan ink A.

| Components of cyan ink A | |
|---|---|
| cyan dispersion liquid | 40% |
| following nonionic compound 2 (nonionic polymerizable monomer) | 19% |
| SANNIX GP250 (trade name, water-soluble organic solvent, manufactured by Sanyo Chemical Industries, Ltd.) | 1% |
| OLFIN E1010 (trade name, manufactured by Nisshin Chemical Industry Co.) | 1% |
| IRGACURE 2959 (trade name, photopolymerization initiator, manufactured by Ciba Japan K.K.) | 2.9% |
| ion-exchanged water | Water was added to make the total 100%. |

Nonionic compound 2

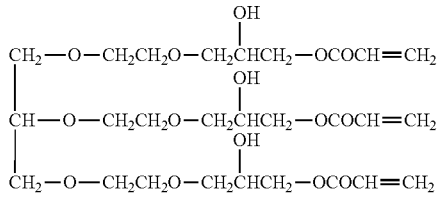

<<Preparation of Magenta Ink A>>
—Preparation of Magenta Dispersion Liquid—

A magenta dispersion liquid was prepared in the same manner as the cyan dispersion liquid, except that a magenta pigment (trade name: PIGMENT RED 122, manufactured by Ciba Japan K.K.) was used in place of the cyan pigment.

—Preparation of Magenta Ink A—

A magenta ink A was prepared in the same manner as the cyan ink, except that the magenta dispersion liquid was used in place of the cyan dispersion liquid.

<<Preparation of Cyan Ink B>>

The polymerizable monomer was changed to the following nonionic compound (c), and the following ingredients were mixed to make a cyan ink B.

| Ingredients of cyan ink B | |
|---|---|
| cyan dispersion liquid | 40% |
| following nonionic compound c (nonionc polymerizable monomer) | 19% |
| SANNIX GP250 (trade name, hydrophilic organic solvent, manufactured by Sanyo Chemical Industries, Ltd.) | 1% |

-continued

| Ingredients of cyan ink B | |
|---|---|
| OLFIN E1010 (trade name, manufactured by Nisshin Chemical Industry Co.) | 1% |
| IRGACURE 2959 (trade name, photopolymerization initiator, manufactured by Ciba Japan K.K.) | 2.9% |
| ion-exchanged water | Water was added to make the total 100%. |

(c)

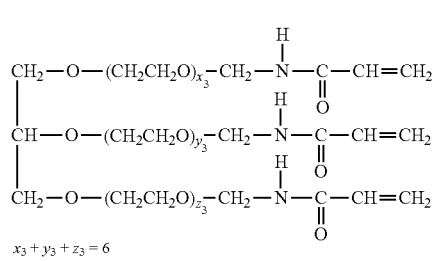

$x_3 + y_3 + z_3 = 6$

<<Preparation of Magenta Ink B>>

A magenta ink B was prepared in the same manner as the cyan ink B, except that the magenta dispersion liquid was used in place of the cyan dispersion liquid.

<<Preparation of Cyan Ink C>>

The following ingredients were mixed with no addition of a polymerizable monomer, thereby making a cyan ink C.

| -Ingredients of cyan ink C- | |
|---|---|
| cyan dispersion liquid | 40% |
| SANNIX GP250 (trade name, hydrophilic organic solvent, manufactured by Sanyo Chemical Industries, Ltd.) | 10% |
| tripropylene glycol monomethyl ether | 8% |
| OLFIN E1010 (trade name, manufactured by Nisshin Chemical Industry Co.) | 1% |
| ion-exchanged water | Water was added to make the total 100%. |

<<Preparation of Magenta Ink C>>

A magenta ink C was prepared in the same manner as the cyan ink C, except that the magenta dispersion liquid was used in place of the cyan dispersion liquid.

<Image Formation>

Images were formed as described below, using the combinations of the recording media and ink compositions listed in Table 2.

An ink jet apparatus used herein included an ink ejection unit for ejecting various aqueous inks, an ink drying zone for drying the ejected aqueous inks, and a UV irradiation unit having a UV irradiation lamp which may emit ultraviolet light (UV), which were arranged in this order in the transport direction of the recording medium.

The ink ejection unit includes, a black ink ejection head, a cyan ink ejection head, a magenta ink ejection head, and a yellow ink ejection head, which are arranged in this order in the transport direction. These heads are 1200 dpi/10 inch full line heads (drive frequency: 25 kHz, recording medium carrying speed: 530 mm/sec), and eject the respective colors by a single pass system in the main scanning direction.

In the ink jet apparatus configured as described above, the ink compositions prepared above were charged into the reserve tanks connected to the ink ejection heads of the respective colors, and a solid image and a 1200 dpi line image were recorded on recording media.

During the image recording, the color inks were ejected at a definition of 1200 dpi×1200 dpi, an ink droplet volume of 2.8 pl, and the maximum deposit of the ink composition of 8.5 ml/m². The line image was recorded by drawing 1-dot width, 2-dot width, and 4-dot width lines at 1200 dpi by a single pass system in the main scanning direction, and the solid image was drawn by ejecting the inks on the entire surface of a sample prepared by cutting the recording medium into A5 size pieces.

In order to record the images, firstly, inks were ejected from the ink ejection heads onto the recording medium by a single pass system to record an image, and then the image was dried in the ink drying zone by applying warm air from a blower to the recorded surface at 120° C., 5 msec, for 15 seconds, while the backside (back face) of the ink-deposited surface heated with an infrared heater. After drying, the image was irradiated with UV light in the UV irradiation unit (metal halide lamp manufactured by Eye Graphics Co., Ltd., maximum irradiation wavelength: 365 nm) to give a total radiation dose of 3000 mJ/cm², thereby hardening the image.

<Image Evaluation>

—1. Image Quality (Drawing Properties)—

The 1-dot width, 2-dot width, and 4-dot width lines, which had been recorded on the recording medium as described above, were evaluated for the drawing properties based on the following ratings. The evaluation results are listed in Table 2.

~Evaluation Standards~

1: All lines were uniform.

2: The 1-dot line was homogeneous, but the 2-dot and 4-dot lines partially had line width nonuniformity, cleavages of the line, and ink puddles (limit of practical application).

3: The 1-dot line was homogeneous, but the 2-dot and 4-dot lines entirely had line width nonuniformity, cleavages of the line, and ink puddles.

4: Line width nonuniformity, cleavages of the line, and ink puddles were conspicuously observed all over the lines.

—2. Image Adhesiveness—

A piece of CELLOPHANE TAPE (trade name, manufactured by Nichiban Co., Ltd.) was attached to the solid image portion prepared above one day after drawing, and removed immediately after the attachment. The degree of ink peeling from the image was evaluated on a five-point scale, with 5 for the peeling of almost entire surface, and 1 for no peeling:

~Evaluation Standards~

1: No peeling occurred.

2: Peeling of the image was unobservable, but the adhesive surface of the removed tape was slightly colored.

3: Background of the medium was barely seen by careful observation, and the adhesive surface of the removed tape was slightly colored (limit of practical application).

4: Many white spots of peeling were found on the image by visual observation.

5: The entire surface was peeled, and the background of the paper was exposed.

TABLE 2

|  | | Acidic substance | Water-soluble polyvalent metal compound | Cobb water absorption degree (g/m²) | Water absorption in the second layer (ml/m²) | Surface pH | Cyan ink | Magenta ink | Drawing properties | Adhesiveness |
|---|---|---|---|---|---|---|---|---|---|---|
| Example 1 | Recording medium 1 | nitric acid | — | 0.9 | 3.7 | 3.5 | A | A | 2 | 2 |
| Example 2 | Recording medium 2 | lactic acid | — | 0.9 | 3.6 | 3.5 | A | A | 2 | 2 |
| Example 3 | Recording medium 3 | tartaric acid | — | 0.8 | 3.7 | 3.5 | A | A | 1 | 1 |
| Example 4 | Recording medium 4 | malic acid | — | 1.0 | 3.7 | 3.5 | A | A | 1 | 1 |
| Example 5 | Recording medium 5 | malonic acid | — | 1.0 | 3.6 | 3.5 | A | A | 1 | 1 |
| Example 6 | Recording medium 6 | citric acid | — | 1.0 | 3.7 | 3.5 | A | A | 1 | 1 |
| Example 7 | Recording medium 7 | fumaric acid | — | 0.8 | 3.6 | 3.5 | A | A | 1 | 1 |
| Example 8 | Recording medium 8 | maleic acid | — | 0.9 | 3.6 | 3.5 | A | A | 1 | 1 |
| Example 9 | Recording medium 9 | succinic acid | — | 0.8 | 3.8 | 3.5 | A | A | 1 | 1 |
| Example 10 | Recording medium 10 | citric acid | Basic polyaluminum chloride | 0.9 | 3.9 | 3.5 | A | A | 1 | 1 |
| Example 11 | Recording medium 11 | citric acid | zirconyl acetate | 1.0 | 3.6 | 3.5 | A | A | 1 | 1 |
| Example 12 | Recording medium 1 | nitric acid | — | 0.9 | 3.7 | 3.5 | B | B | 1 | 1 |
| Comparative Example 1 | Recording medium C1 | nitric acid | — | 4.8 | 3.8 | 3.5 | A | A | 3 | 3 |
| Comparative Example 2 | Recording medium C2 | nitric acid | — | 0.9 | 10.8 | 3.5 | A | A | 3 | 3 |
| Comparative Example 3 | Recording medium C3 | nitric acid | — | 1.0 | 3.6 | 6.0 | A | A | 4 | 3 |
| Comparative Example 4 | Recording medium C4 | — | — | 1.0 | 3.6 | 7.2 | A | A | 4 | 4 |
| Comparative Example 5 | Recording medium C5 | nitric acid | — | 0.9 | 1.7 | 3.5 | A | A | 3 | 3 |
| Comparative Example 6 | Recording medium 1 | nitric acid | — | 0.9 | 3.7 | 3.5 | C | C | 3 | 4 |

The results in Table 2 indicate that the image forming method of the invention allows the formation of high definition images with good adhesiveness to the recording medium and good drawing properties, even in high-speed recording.

The invention includes the following exemplary embodiments.

<1> An image forming method comprising: ejecting an ink composition, using an ink jet apparatus, onto a recording medium thereby forming an image, the ink composition comprising a pigment, a water-soluble polymerizable monomer which is polymerized by actinic energy rays, and water, and the recording medium being composed of a base paper, a first layer including a binder, and a second layer including a white pigment and an acidic substance, which are disposed in this order, wherein a surface of the first layer is disposed on the base paper and has a Cobb water absorption capacity of 2.0 g/m² or less at a contact time of 120 seconds as measured by a water-absorbing capacity test, a surface of the second layer has a water absorption of from 2 ml/m² to 8 ml/m² at a contact time of 0.5 seconds as measured by the Bristow's method, and the surface of the second layer has a pH of 5.5 or less.

<2> The image forming method according to <1>, wherein the acidic substance has a molecular weight of 100 or more, two or more carboxy groups in one molecule thereof, a pKa$_1$ (at 25° C.) of from 2.6 to 4.6, and a pKa$_2$ (at 25° C.) of from 3.8 to 5.4.

<3> The image forming method according to <1> or <2>, wherein the acidic substance has a water solubility (at 25° C.) of 5% by mass or more.

<4> The image forming method according to <1>, wherein the acidic substance has a water solubility (at 25° C.) of from 30% by mass to 70% by mass.

<5> The image forming method according to any one of <1> to <4>, wherein the acidic substance is at least one selected from the group consisting of malonic acid, succinic acid, tartaric acid, malic acid, maleic acid and citric acid.

<6> The image forming method according to <1>, wherein the second layer further comprises a water-soluble polyvalent metal compound.

<7> The image forming method according to <6>, wherein the water-soluble polyvalent metal compound is an aluminium compound or a zirconium compound.

<8> The image forming method according to any one of <1> to <7>, wherein the second layer has a thickness of from 4 μm to 40 μm.

<9> The image forming method according to any one of <1> to <8>, wherein the first layer comprises a hardener to harden the binder.

<10> The image forming method according to any one of <1> to <9>, wherein the pigment in the ink composition is water-dispersible and a surface of the pigment is at least partially coated with a polymer dispersant.

<11> The image forming method according to <10>, wherein the polymer dispersant has a carboxy group.

<12> The image forming method according to any one of <1> to <10>, wherein the polymerizable monomer is a nonionic compound.

<13> The image forming method according to any one of <1> to <12>, wherein a pigment content in the ink composition is from 1.8% by mass to 5.5% by mass, and a polymerizable monomer content in the ink composition is from 10% by mass to 22% by mass.

<14> The image forming method according to any one of <1> to <13>, wherein the ink composition further comprises a photopolymerization initiator.

<15> The image forming method according to any one of <1> to <14>, wherein the binder comprises a thermoplastic resin.

<16> The image forming method according to <15>, wherein the thermoplastic resin is at least one of a polyester urethane resin or a acrylic silicon resin.

<17> The image forming method according to any one of <1> to <16>, wherein the first layer further comprises a white pigment.

<18> The image forming method according to any one of <1> to <17>, wherein at least one of the white pigment included in the first layer or the white pigment included in the second layer is kaolin.

<19> The image forming method according to any one of <1> to <18>, wherein the second layer has a surface pH of 4 or less.

All publications, patent applications, and technical standards mentioned in this specification are herein incorporated by reference to the same extent as if each individual publication, patent application, or technical standard was specifically and individually indicated to be incorporated by reference.

What is claimed is:

1. An image forming method comprising:
    ejecting an ink composition, using an ink jet apparatus, onto a recording medium thereby forming an image, the ink composition comprising a pigment, a water-soluble polymerizable monomer which is polymerized by actinic energy rays, and water, and the recording medium including a base paper, a first layer including a binder, and a second layer including a white pigment and an acidic substance, which are disposed in this order, wherein a surface of the first layer is disposed on the base paper and has a Cobb water absorption capacity of 2.0 g/m² or less at a contact time of 120 seconds as measured by a water-absorbing capacity test, a surface of the second layer has a water absorption of from 2 ml/m² to 8 ml/m² at a contact time of 0.5 seconds as measured by the Bristow's method, and the surface of the second layer has a pH of 5.5 or less,
    wherein the nonionic compound is a compound selected from the group consisting of the following nonionic compounds 1 to 4 and compounds (a) to (k):

Nonionic compound 1

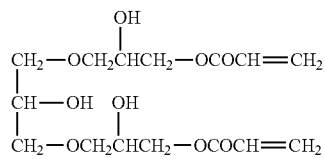

Nonionic compound 2

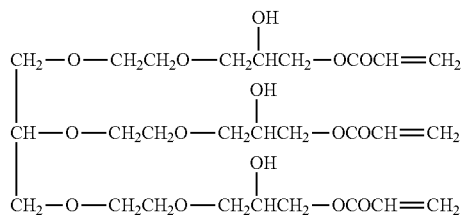

Nonionic compound 3

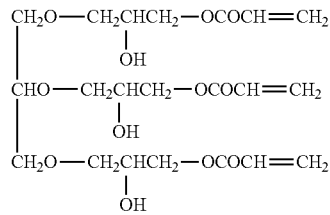

Nonionic compound 4

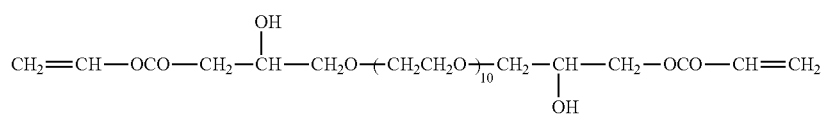

(a)

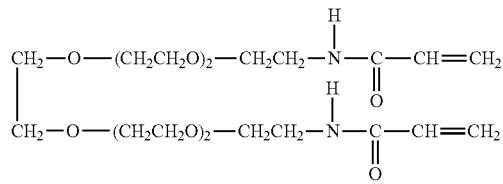

(b)

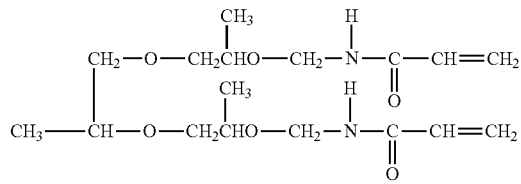

-continued
(c)
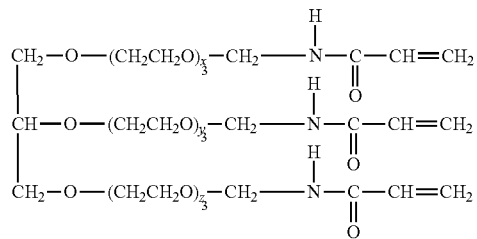
$x_3 + y_3 + z_3 = 6$
(d)
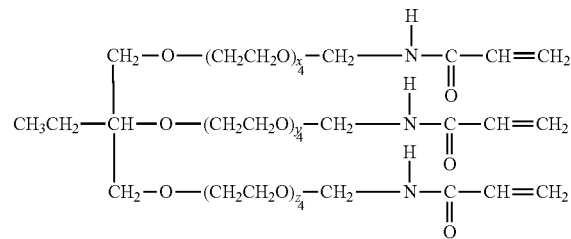
$x_4 + y_4 + z_4 = 9$
(e)
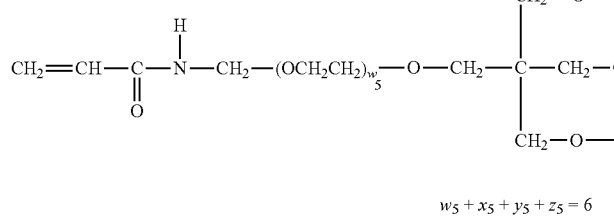
$w_5 + x_5 + y_5 + z_5 = 6$
(f)
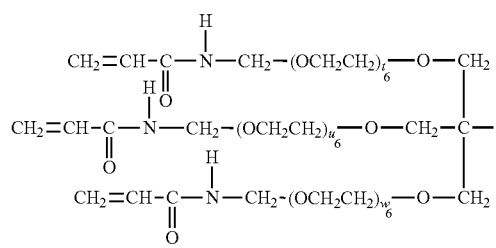
$t_6 + u_6 + w_5 + x_6 + y_6 + z_6 = 12$
(g)
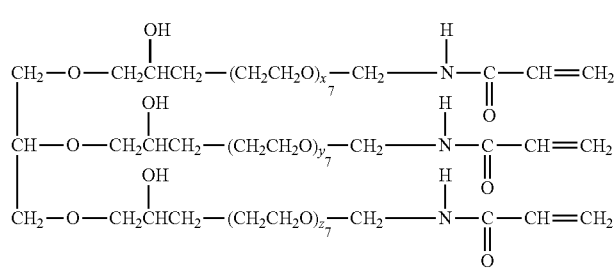
$x_7 + y_7 + z_7 = 3$
(h)
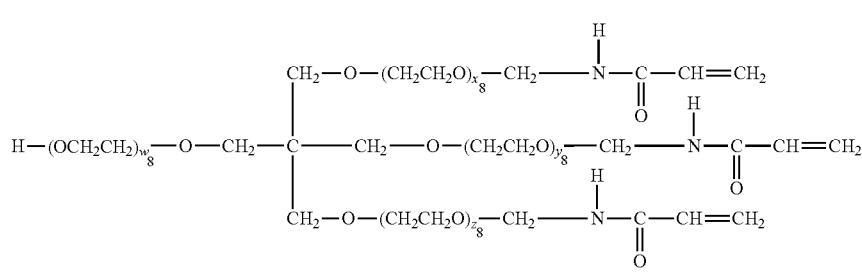
$w_8 + x_8 + y_8 + z_8 = 6$ -continued

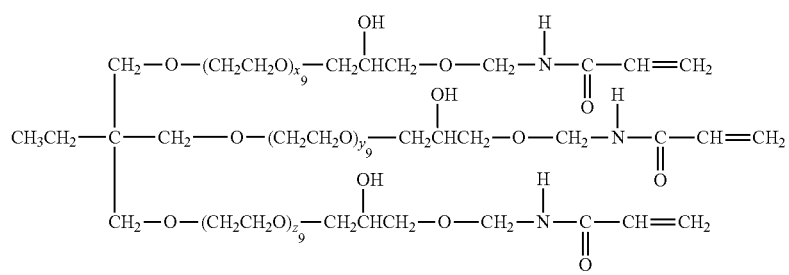

(i)

$x_9 + y_9 + z_9 = 3$

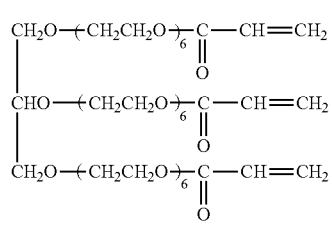

(j)

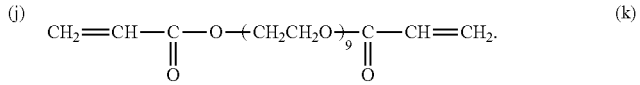

(k)

2. The image forming method according to claim 1, wherein the acidic substance has a molecular weight of 100 or more, two or more carboxy groups in one molecule thereof, a $pKa_1$ (at 25° C.) of from 2.6 to 4.6, and a $pKa_2$ (at 25° C.) of from 3.8 to 5.4.

3. The image forming method according to claim 1, wherein the acidic substance has a water solubility (at 25° C.) of 5% by mass or more.

4. The image forming method according to claim 1, wherein the acidic substance has a water solubility (at 25° C.) of from 30% by mass to 70% by mass.

5. The image forming method according to claim 1, wherein the acidic substance is at least one selected from the group consisting of malonic acid, succinic acid, tartaric acid, malic acid, maleic acid and citric acid.

6. The image forming method according to claim 1, wherein the second layer further comprises a water-soluble polyvalent metal compound.

7. The image forming method according to claim 6, wherein the water-soluble polyvalent metal compound is an aluminium compound or a zirconium compound.

8. The image forming method according to claim 1, wherein the second layer has a thickness of from 4μm to 40 μm.

9. The image forming method according to claim 1, wherein the first layer comprises a hardener to harden the binder.

10. The image forming method according to claim 1, wherein the pigment in the ink composition is water-dispersible and a surface of the pigment is at least partially coated with a polymer dispersant.

11. The image forming method according to claim 10, wherein the polymer dispersant has a carboxy group.

12. The image forming method according to claim 1, wherein the polymerizable monomer is a nonionic compound.

13. The image forming method according to claim 1, wherein a pigment content in the ink composition is from 1.8% by mass to 5.5% by mass, and a polymerizable monomer content in the ink composition is from 10% by mass to 22% by mass.

14. The image forming method according to claim 1, wherein the ink composition further comprises a photopolymerization initiator.

15. The image forming method according to claim 1, wherein the binder comprises a thermoplastic resin.

16. The image forming method according to claim 15, wherein the thermoplastic resin is at least one of a polyester urethane resin or an acrylic silicon resin.

17. The image forming method according to claim 1, wherein the first layer further comprises a white pigment.

18. The image forming method according to claim 1, wherein at least one of the white pigment included in the first layer or the white pigment included in the second layer is kaolin.

19. The image forming method according to claim 1, wherein the second layer has a surface pH of 4 or less.

20. The image forming method according to claim 1, wherein a content ratio of the solid content of the pigment to the water-soluble polymerizable monomer (pigment:water-soluble polymerizable monomer) is from 1:1 to 1:30.

* * * * *